US012106754B2

United States Patent
Ko

(10) Patent No.: US 12,106,754 B2
(45) Date of Patent: Oct. 1, 2024

(54) SYSTEMS AND OPERATION METHODS FOR DEVICE SELECTION USING AMBIENT NOISE

(71) Applicant: SAMSUNG ELECTRONICS CO., LTD., Suwon-si (KR)

(72) Inventor: Hyeonmok Ko, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 157 days.

(21) Appl. No.: 16/671,317

(22) Filed: Nov. 1, 2019

(65) Prior Publication Data
US 2020/0143807 A1 May 7, 2020

(30) Foreign Application Priority Data

Nov. 5, 2018 (KR) .................. 10-2018-0134432
Jul. 5, 2019 (KR) .................. 10-2019-0081529

(51) Int. Cl.
*G10L 15/22* (2006.01)
*G10L 15/08* (2006.01)
(Continued)

(52) U.S. Cl.
CPC .............. *G10L 15/22* (2013.01); *G10L 15/16* (2013.01); *G10L 15/20* (2013.01); *G10L 15/30* (2013.01);
(Continued)

(58) Field of Classification Search
CPC ......... G10L 15/00; G10L 15/16; G10L 15/20; G10L 15/22; G10L 15/30; G10L 2015/088; G10L 2015/228
See application file for complete search history.

(56) References Cited

U.S. PATENT DOCUMENTS 7,228,275 B1 * 6/2007 Endo ...................... G10L 15/32
704/231
8,340,975 B1 * 12/2012 Rosenberger ........... G10L 15/22
704/274
(Continued)

FOREIGN PATENT DOCUMENTS

CN 102903362 A 1/2013
CN 107146613 A 9/2017
(Continued)

OTHER PUBLICATIONS

Morbini, F., Audhkhasi, K., Sagae, K., Artstein, R., Can, D., Georgiou, P., Narayanan, S., Leuski, A. and Traum, D., Aug. 2013. "Which ASR should I choose for my dialogue system?". In Proceedings of the SIGDIAL 2013 Conference (pp. 394-403). (Year: 2013).*

(Continued)

*Primary Examiner* — Daniel C Washburn
*Assistant Examiner* — Sean E Serraguard
(74) *Attorney, Agent, or Firm* — Sughrue Mion, PLLC

(57) ABSTRACT

Providing a response to a user's speech or utterance by obtaining context information of the electronic device or a user of the electronic device, determine whether the electronic device or an external device is to perform automated speech recognition (ASR) of the user's speech or utterance, based on the context information, and provide a response to the user's speech or utterance based on a result of the electronic device or the external device performing the ASR.

18 Claims, 17 Drawing Sheets

(51) Int. Cl.
  *G10L 15/16* (2006.01)
  *G10L 15/20* (2006.01)
  *G10L 15/30* (2013.01)
(52) U.S. Cl.
  CPC .. *G10L 2015/088* (2013.01); *G10L 2015/228* (2013.01)

(56) References Cited

U.S. PATENT DOCUMENTS

| | | | |
|---|---|---|---|
| 8,660,847 B2 | 2/2014 | Soemo et al. | |
| 8,798,995 B1 | 8/2014 | Edara | |
| 9,685,156 B2 | 6/2017 | Borjeson et al. | |
| 10,332,508 B1* | 6/2019 | Hoffmeister | G06N 3/08 |
| 10,482,904 B1* | 11/2019 | Hardie | G10L 15/22 |
| 2003/0191646 A1 | 10/2003 | D'Avello et al. | |
| 2005/0114135 A1* | 5/2005 | Kemp | G10L 15/08 |
| | | | 704/256 |
| 2006/0009980 A1* | 1/2006 | Burke | G10L 15/30 |
| | | | 704/270 |
| 2006/0200350 A1* | 9/2006 | Attwater | G10L 15/22 |
| | | | 704/E15.041 |
| 2013/0060571 A1 | 3/2013 | Soemo et al. | |
| 2013/0238325 A1* | 9/2013 | Kristjansson | G10L 21/0208 |
| | | | 704/226 |
| 2014/0278391 A1* | 9/2014 | Braho | G10L 25/78 |
| | | | 704/233 |
| 2014/0278415 A1 | 9/2014 | Ivanov et al. | |
| 2014/0316778 A1 | 10/2014 | Venkatesha et al. | |
| 2015/0161994 A1* | 6/2015 | Tang | G10L 15/063 |
| | | | 704/232 |
| 2015/0279352 A1 | 10/2015 | Willett et al. | |
| 2015/0310867 A1* | 10/2015 | LeBeau | H04M 1/72454 |
| | | | 455/563 |
| 2016/0189715 A1 | 6/2016 | Nishikawa | |
| 2016/0267913 A1* | 9/2016 | Kim | G10L 15/22 |
| 2016/0284349 A1 | 9/2016 | Ravindran et al. | |
| 2017/0213156 A1 | 7/2017 | Hammond et al. | |
| 2018/0053510 A1* | 2/2018 | Kofman | G11B 27/34 |
| 2018/0286401 A1 | 10/2018 | Oh et al. | |
| 2019/0066670 A1* | 2/2019 | White | G10L 15/28 |
| 2019/0311720 A1* | 10/2019 | Pasko | G10L 15/32 |
| 2020/0193973 A1* | 6/2020 | Tolomei | G10L 15/22 |
| 2021/0327433 A1* | 10/2021 | Wood | G10L 15/22 |

FOREIGN PATENT DOCUMENTS

| | | |
|---|---|---|
| CN | 107257996 A | 10/2017 |
| CN | 107430870 A | 12/2017 |
| CN | 107622767 A | 1/2018 |
| CN | 108665890 A | 10/2018 |
| JP | 2007-304505 A | 11/2007 |
| WO | 2009019783 A1 | 2/2009 |
| WO | 2015/041892 A1 | 3/2015 |

OTHER PUBLICATIONS

Communication dated Jan. 23, 2020 issued by the International Searching Authority in counterpart Application No. PCT/KR2019/013637 (PCT/ISA/220, PCT/ISA/210, and PCT/ISA/237).

Communication dated Apr. 17, 2020, issued by the European Patent Office in counterpart European Application No. 19204833.8.

Communication issued by the China National Intellectual Property Administration on Feb. 8, 2023 in Chinese Patent Application No. 201911065435.3.

Communication issued on Jul. 19, 2023 by the China National Intellectual Property Administration for Chinese Patent Application No. 201911065435.3.

\* cited by examiner

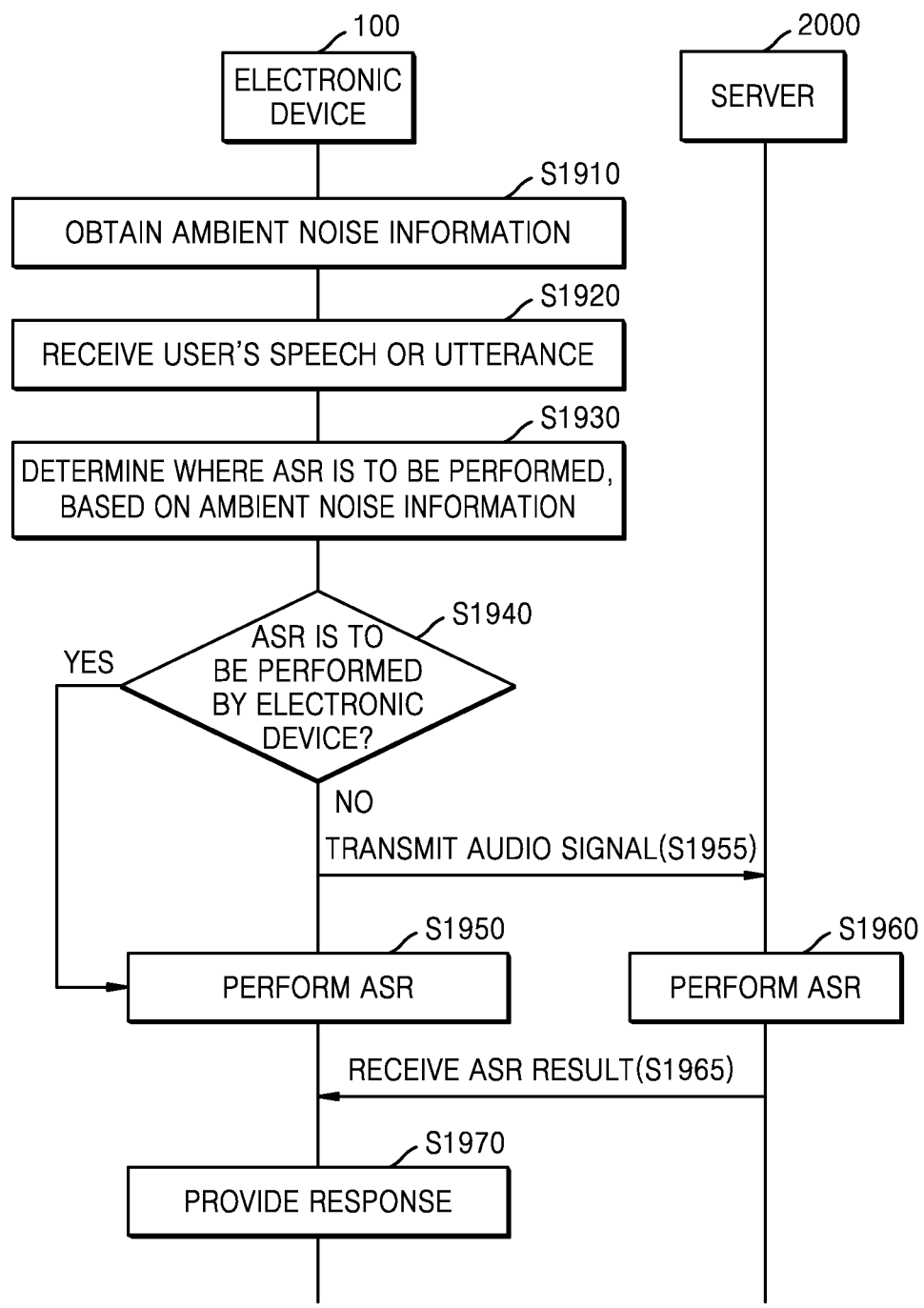

SYSTEMS AND OPERATION METHODS FOR DEVICE SELECTION USING AMBIENT NOISE

CROSS-REFERENCE TO RELATED APPLICATION(S)

This application is based on and claims priority under 35 U.S.C. § 119 to Korean Patent Application No. 10-2018-0134432, filed on Nov. 5, 2018, and Korean Patent Application No. 10-2019-0081529, filed on Jul. 5, 2019, in the Korean Intellectual Property Office, the disclosures of which are incorporated by reference herein in their entireties.

BACKGROUND

1. Field

Various embodiments of the disclosure relate to an electronic device and an operation method thereof, and more particularly, to an electronic device and an operation method thereof, in which a response to a user's speech or utterance may be provided.

2. Description of the Related Art

A virtual assistant is a service that provides a response to a user's speech or utterance by processing an audio signal. The processing of the audio signal may include applying automated speech recognition (ASR) processing, natural language understanding (NLU) processing, dialogue management (DM) processing, natural language generation (NLG) processing, and text-to-speech (TTS) processing to the audio signal.

Generally, most audio signal and/or speech processing associated with a virtual assistant is performed by a server, and a user device receives input of a user's speech or utterance and receives a processing result from a server to thereby output the processing result to the user. Each operation may be performed through an algorithm based on rules other than artificial intelligence (AI), and AI may be combined with audio signal processing to improve performance of the virtual assistant.

SUMMARY

Various embodiments of the disclosure provide an electronic device and an operation method thereof, in which a device from among various possible devices is selected to perform automated speech recognition (ASR) with respect to a user's speech or utterance, based on context information of the electronic device, and a response to the user's speech or utterance is provided to the user by the electronic device based on a result of the ASR.

Additional aspects will be set forth in part in the description which follows and, in part, will be apparent from the description, or may be learned by practice of the presented embodiments of the disclosure.

According to an embodiment of the disclosure, there is provided an electronic device including a memory storing one or more instructions and at least one processor configured to execute the one or more instructions stored in the memory to determine that the electronic device is to perform automated speech recognition (ASR) of a speech or an utterance of a user of the electronic device, based on ambient noise information of the electronic device obtained from an audio signal of the speech or the utterance of the user of the electronic device, perform the ASR of the speech or the utterance of the user of the electronic device based on determining that the electronic device is to perform the ASR of the speech or the utterance of the user of the electronic device, and output a response to the speech or the utterance of the user of the electronic device, based on a result of performing the ASR of the speech or the utterance of the user of the electronic device.

According to an embodiment of the disclosure, the ASR may be processed using an artificial intelligence (AI) algorithm.

According to an embodiment of the disclosure, the at least one processor may be further configured to execute the one or more instructions to predict an accuracy of the ASR, based on the ambient noise information, and determine that the electronic device is to perform the ASR based on the accuracy of the ASR.

According to an embodiment of the disclosure, the at least one processor may be further configured to execute the one or more instructions to determine that the electronic device is to perform the ASR of the speech or the utterance of the user of the electronic device based on the ambient noise information indicating that an ambient noise level of the electronic device is less than a preset value.

According to an embodiment of the disclosure, the electronic device may further include a communicator configured to transmit and receive data to and from an external device, and the at least one processor may be further configured to execute the one or more instructions to transmit an audio signal of the speech or the utterance of the user of the electronic device to the external device and receive, from the external device, an ASR result of the speech or the utterance of the user of the electronic device, based on the ambient noise information indicating that the ambient noise level of the electronic device is greater than or equal to the preset value.

According to an embodiment of the disclosure, the at least one processor may be further configured to execute the one or more instructions to extract a keyword included in the speech or the utterance of the user of the electronic device based on the ambient noise information indicating that an ambient noise level of the electronic device has a value in a preset range, and to determine that the electronic device is to perform the ASR of the speech or the utterance of the user of the electronic device based on the keyword being a preset keyword and based on the ambient noise information of the electronic device.

According to an embodiment of the disclosure, the electronic device may further include a communicator configured to transmit and receive data to and from an external device, and the at least one processor may be further configured to execute the one or more instructions to obtain a first ASR result by performing the ASR of the speech or the utterance of the user of the electronic device, control the communicator to transmit the audio signal of the speech or the utterance of the user of the electronic device to the external device, receive a second ASR result from the external device, select an ASR result from among the first ASR result and the second ASR result, and output the response to the speech or the utterance of the user of the electronic device, based on the ASR result.

According to an embodiment of the disclosure, the processor may be further configured to execute the one or more instructions to select the ASR result from among the first ASR result and the second ASR result, based on the ambient noise information of the electronic device.

According to an embodiment of the disclosure, the processor may be further configured to execute the one or more instructions to determine whether the electronic device is to perform at least one of NLU or DM, based on at least one of the ambient noise information or the result of performing the ASR of the speech or the utterance of the user of the electronic device.

According to an embodiment of the disclosure, the processor may be further configured to execute the one or more instructions to determine the response by performing at least one of NLU or DM based on the result of performing the ASR of the speech or the utterance of the user of the electronic device.

According to an embodiment of the disclosure, there is provided an operation method of an electronic device including determining that the electronic device is to perform automated speech recognition (ASR) of a speech or an utterance of a user of the electronic device, based on ambient noise information of the electronic device obtained from an audio signal of the speech or the utterance of the user of the electronic device, performing the ASR of the speech or the utterance of the user of the electronic device based on determining that the electronic device is to perform the ASR of the speech or the utterance of the user of the electronic device, and outputting a response to the speech or the utterance of the user of the electronic device, based on a result of performing the ASR of the speech or the utterance of the user of the electronic device.

According to an embodiment of the disclosure, there is provided an ASR system including an electronic device configured to receive a speech or an utterance of a user of the electronic device and a server configured to perform ASR of the speech or the utterance of the user of the electronic device based on an audio signal of the speech or the utterance of the user of the electronic device received from the electronic device, in which the electronic device includes at least one processor, in which the at least one processor may be configured to determine whether the electronic device or the server is to perform the ASR of the speech or the utterance of the user of the electronic device, based on ambient noise information of the electronic device obtained from the audio signal of the speech or the utterance of the user of the electronic device and transmit the audio signal of the speech or the utterance of the user of the electronic device to the server based on determining that the server is to perform the ASR of the speech or the utterance of the user of the electronic device or perform the ASR of the speech or the utterance of the user of the electronic device based on determining that the electronic device is to perform the ASR of the speech or the utterance of the user of the electronic device.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 19 is a flowchart of an operation method of an electronic device, according to an embodiment of the disclosure.

DETAILED DESCRIPTION

Figure 1:
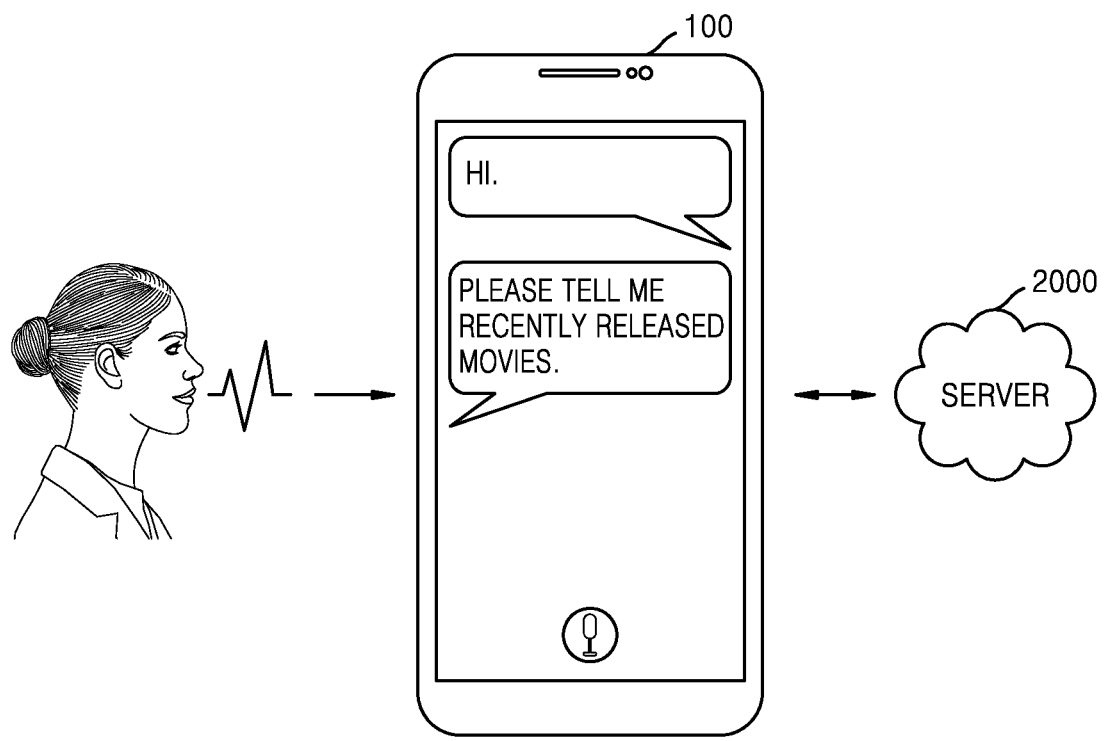
FIG. 1 is a diagram for describing an automated speech recognition (ASR) system according to an embodiment of the disclosure.

Terms used herein will be described in brief, and the disclosure will be described in detail.

Although terms used in the disclosure are selected with general terms popularly used at present under the consideration of functions in the disclosure, the terms may vary according to the intention of those of ordinary skill in the art, judicial precedents, or introduction of new technology. In addition, in a specific case, certain terms may be selected, and in this case, the meaning of the terms is disclosed in a corresponding description part of the disclosure. Thus, the terms used in the disclosure should be defined not by the simple names of the terms but by the meaning of the terms and the contents throughout the disclosure.

Throughout the entirety of the specification of the disclosure, when a certain part includes a certain component, the term 'including' means that a corresponding component may further include other components unless a specific meaning opposed to the corresponding component is written. The term used in the embodiments of the disclosure such as "unit" or "module" indicates a unit for processing at least one function or operation, and may be implemented in hardware, software, or in a combination of hardware and software.

Hereinafter, embodiments of the disclosure will be described in detail with reference to the attached drawings to allow those of ordinary skill in the art to easily carry out the embodiments of the disclosure. However, the disclosure may be implemented in various forms, and are not limited to the embodiments of the disclosure described herein. To clearly describe the disclosure, parts that are not associated with the description have been omitted from the drawings, and throughout the specification, identical reference numerals refer to identical parts.

FIG. 1 is a diagram for describing an automated speech recognition (ASR) system according to an embodiment of the disclosure.

The ASR system according to an embodiment of the disclosure may include an electronic device 100 and a server 2000.

The electronic device 100 according to an embodiment of the disclosure may be embodied by and/or implemented with various electronic devices such as a cellular phone, a tablet personal computer (PC), a digital camera, a camcorder, a laptop computer, a desktop, an electronic(e)-book terminal, a digital broadcasting terminal, a personal digital assistant (PDA), a portable multimedia player (PMP), a navigator, an MP3 player, a camcorder, an Internet protocol television (IPTV), a digital TV (DTV), a wearable device, and so forth.

The server 2000 according to an embodiment of the disclosure may be interconnected with the electronic device 100 through, but not limited to, a network such as the Internet or a local area network via WiFi, or short-range communication such as Bluetooth or near field communication (NFC).

In an embodiment of the disclosure, the term "user" means a person who controls a function of the electronic device 100 or an operation of the electronic device 100, and may include a manager or an installation engineer.

The electronic device 100 according to an embodiment of the disclosure may provide an interactive interface. The interactive interface may be an interface for the user, and the interactive interface receives an input (e.g., a voice input or a text input) from the user and provides a response to the input of the user. According to an embodiment of the disclosure, the interactive interface may include, but is not limited to, the virtual assistant, an artificial intelligence (AI) assistant, etc. The virtual assistant or the AI assistant may be a software agent that processes a task required by the user and provides a user-specific service to the user based on one or more commands of the user or context of the user and/or the electronic device 100.

Referring to FIG. 1, the user may provide a speech or utterance that is detected by the electronic device 100. The speech or utterance may include a natural language that causes the electronic device 100 to perform a designated function (e.g., operation control, content search, etc., with respect to hardware/software components included in the electronic device 100).

The electronic device 100 may convert the user's speech or utterance into an audio signal that is a sort of an electrical signal, by using an internal or external audio input module (e.g., a microphone). The electronic device 100 may receive an audio signal corresponding to the user's utterance from an external device. For example, when the user makes a speech or utterance with respect to an external device including the audio input module, the external device may convert the user's speech or utterance into an audio signal and transmit the audio signal to the electronic device 100.

The electronic device 100 according to an embodiment of the disclosure may obtain context information of the electronic device 100 and/or context information of the user of the electronic device 100. The context information of the electronic device 100 and/or context information of the user of the electronic device 100 may include computing context information, user context information, physical context information, time context information, etc. For example, the computing context information may include network connection state information, communication bandwidth information, and so forth between the electronic device 100 and the server 2000. The user context information may include user's location information, user's voice feature information, and so forth. The physical context information may include ambient noise level information, location information of the electronic device 100, etc., and the time context information may include time information of the electronic device 100, etc.

In particular, the electronic device 100 according to an embodiment of the disclosure may obtain information about noise (e.g., ambient noise information in an environment surrounding the electronic device 100) from the audio signal. The information about noise may include a signal-to-noise ratio (SNR), a magnitude of the noise, a pattern of the noise, etc., and may include information in another form about the noise. However, the information about the environment noise is not limited to these examples.

The electronic device 100 according to an embodiment of the disclosure may obtain the context information by using various sensors that provide context information, communication with one or more devices that provide context information, etc.

The electronic device 100 may determine which of the electronic device 100 and the server 2000 is to perform automated speech recognition (ASR) with respect to the user's speech or utterance, based on the obtained context information.

For example, the electronic device 100 may detect an ambient noise level and determine that the electronic device 100 is to perform the ASR when the detected noise level is less than a preset value. For example, if a signal-to-noise ratio (SNR) or a magnitude of the noise is less than a preset value, then the electronic device 100 may perform ASR. If a pattern of the noise is a repetitive pattern, which might be easily detected and filtered from the audio signal, then the electronic device 100 may perform ASR. On the other hand, when the detected noise level is for example greater than or equal to the preset value, the electronic device 100 may determine that the server 2000 is to perform the ASR and transmit the audio signal corresponding to the user's speech or utterance to the server 2000. For example, if a signal-to-noise ratio (SNR) or a magnitude of the noise is greater than a preset value, then the server 200 may perform ASR. If a pattern of the noise is an arbitrary pattern or a non-repetitive pattern, which might not be easily detected and filtered from the audio signal, then the server 200 may perform ASR. However, the disclosure is not limited to these examples.

The electronic device 100 according to an embodiment of the disclosure may determine which of the electronic device 100 and the server 2000 is to perform NLU processing and DM processing, or any other audio signal processing, with respect to a result of the ASR.

Figure 2:
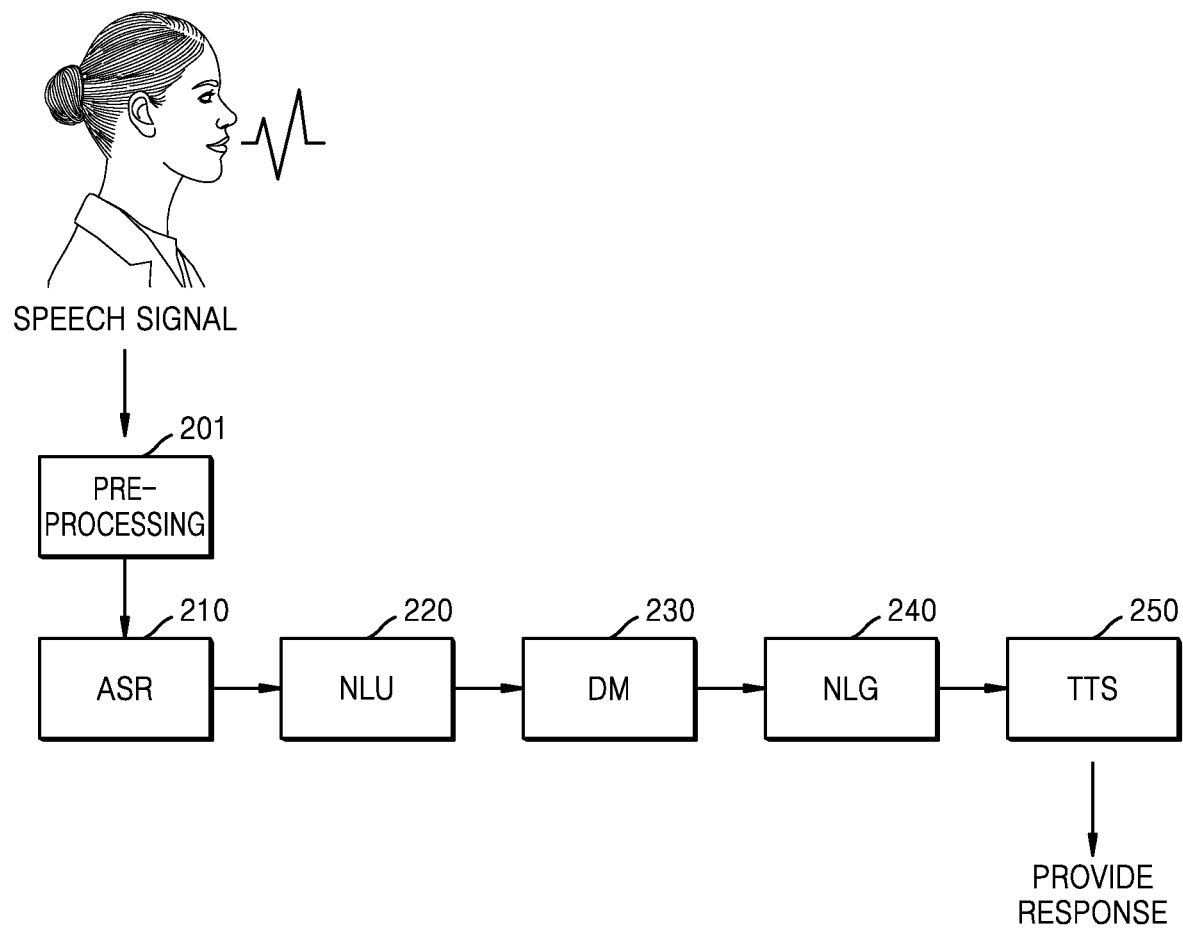
FIG. 2 is a diagram for describing a method of determining and providing a response to a user's speech or utterance, according to an embodiment of the disclosure.

FIG. 2 is a view describing a method of determining and providing a response to a user's speech or utterance, according to an embodiment of the disclosure.

Referring to FIG. 2, the user may make a speech or utterance with respect to the electronic device 100 according to an embodiment of the disclosure. The electronic device 100 may convert the user's speech or utterance into an audio signal that is a sort of an electrical signal, by using an audio input module.

The electronic device 100 or the server 2000 according to an embodiment of the disclosure may perform at least one of pre-processing 201, ASR 210, natural language understanding (NLU) 220, dialogue management (DM) 230, natural language generation (NLG) 240, or text-to-speech (TTS) 250 with respect to the audio signal, and thus a response to the user's speech or utterance may be determined, and the electronic device 100 may provide the determined response to the user.

The electronic device 100 or the server 2000 according to an embodiment of the disclosure may perform pre-processing 201 before performing the ASR 210 with respect to the audio signal.

The pre-processing 201 may include identifying the noise and the user's speech or utterance from the audio signal and attenuating or removing the noise. The pre-processing 201 may also include identifying an utterance period including a user's voice and a non-utterance period not including the user's voice and removing the non-utterance period. Identifying and removing the non-utterance period may be performed after completion of attenuation or removal of the noise.

The electronic device 100 according to an embodiment of the disclosure may obtain ambient noise information of the electronic device 100 in the pre-processing 201. The electronic device 100 may obtain an SNR as noise information.

For example, when the electronic device 100 attenuates or removes noise, the electronic device 100 may obtain an SNR in which the SNR may be defined as a relative magnitude of a signal corresponding to the user's utterance with respect to a signal corresponding to the noise. The SNR may be generally measured in a decibel (dB) unit.

The SNR may be obtained when identifying the utterance period and the non-utterance period and removing the non-utterance period are performed. To identify the utterance period and the non-utterance period, a voice activity detection (VAD) technique may be used, and in this process, the SNR may be obtained during the utterance period. Information about the magnitude of the noise may be obtained during the non-utterance period and may be used in place of the SNR.

The electronic device 100 according to an embodiment of the disclosure may obtain noise information by using the entire audio signal input in the pre-processing 201, and may obtain noise information by using a signal corresponding to a preset partial period of the audio signal or a signal corresponding to a preset point in time in the audio signal.

The pre-processing 201 may be initiated when a wakeup word is detected or a predefined input is received using a technique such as a keyword spotting, etc. The predefined input may be an input of a of press a physical button or an input to select an icon displayed on a display of the electronic device 100. Upon start of the pre-processing 201, the electronic device 100 may obtain noise information regarding an input audio signal. In this case, by using endpoint detection, the noise information may be obtained from an audio signal from a point in time corresponding to start of the pre-processing 201 to a point in time corresponding to an endpoint.

The electronic device 100 may obtain noise information from an audio signal input during a preset time period from the point in time corresponding to start of the pre-processing 201. In another example, the electronic device 100 may obtain noise information from an audio signal input at a point in time after a lapse of a preset time from the point in time corresponding to start of the pre-processing 201.

In particular, when the electronic device 100 identifies the utterance period and the non-utterance period and removes the non-utterance period in the pre-processing 201, to obtain the noise information, the electronic device 100 may obtain from the audio signal, noise information regarding the entire signal from which the non-utterance period is removed. The electronic device 100 may also obtain noise information from a signal corresponding to a preset partial period of the non-utterance period and obtain noise information from a signal at a preset point in time of the non-utterance period.

When the electronic device 100 obtains noise information from a signal corresponding to a specific time period, the electronic device 100 may obtain noise information by using at least one of maximum values, median values, or average values of a magnitude of noise and a magnitude of the speech or utterance in the signal corresponding to the specific time period. The electronic device 100 may also obtain the noise information in this way when the electronic device 100 obtains the noise information from the input audio signal and when the electronic device 100 obtains the noise information from the signal corresponding to the utterance period. Also when the electronic device 100 obtains the noise information from the signal corresponding to the non-utterance period, the electronic device 100 may obtain the noise information by using at least one of the maximum value, the median value, or the average value of the magnitude of the noise in the signal corresponding to the non-utterance period.

In another embodiment of the disclosure, the noise information may include information about a pattern of noise. The pattern of the noise may mean a form in which the noise is distributed, and an example thereof may be a form in which the noise is uniformly distributed in the audio signal or the noise of a magnitude greater than or equal to a specific magnitude is distributed in a particular period of the audio signal. For example, the accuracy of the ASR 210 may vary with the form in which the noise is distributed.

The ASR 210 may include processing to obtain text data corresponding to the audio signal, such as by speech-to-text conversion. For example, the ASR 210 may support speech-to-text conversion processing to recognize a speech signal uttered by the user as a string. A text obtained as a result of the ASR 210 may be a sentence, a word, or a phrase in a natural language. However, the speech-to-text conversion is not limited to this example.

The NLU 220 may include processing to recognize a meaning of a user's speech or utterance in the text data obtained by the ASR. For example, the NLU 220 may include processing to generate a linguistic structure for a user's speech or utterance by using the string included in the text data obtained by the ASR. The NLU 220 may also include processing to identify an intention such as an action desired by the user through the speech or utterance and to understand a key word.

The DM 230 may include processing to search for information based on the user's intention extracted as a result of the NLU 220 or to prescribe an action such as controlling a device, etc. For example, the DM 230 may include processing to determine a corresponding action such as controlling operations of hardware/software components included in the electronic device 100. The DM 230 may also include processing to determine an order of a plurality of actions as a response to the user's speech or utterance, when the plurality of actions are determined.

The NLG 240 may include processing to generate a text expression (e.g., a sentence) corresponding to a result of the DM 230.

The TTS 250 may include processing to deliver the generated text expression to the user through a speech.

Figure 3:
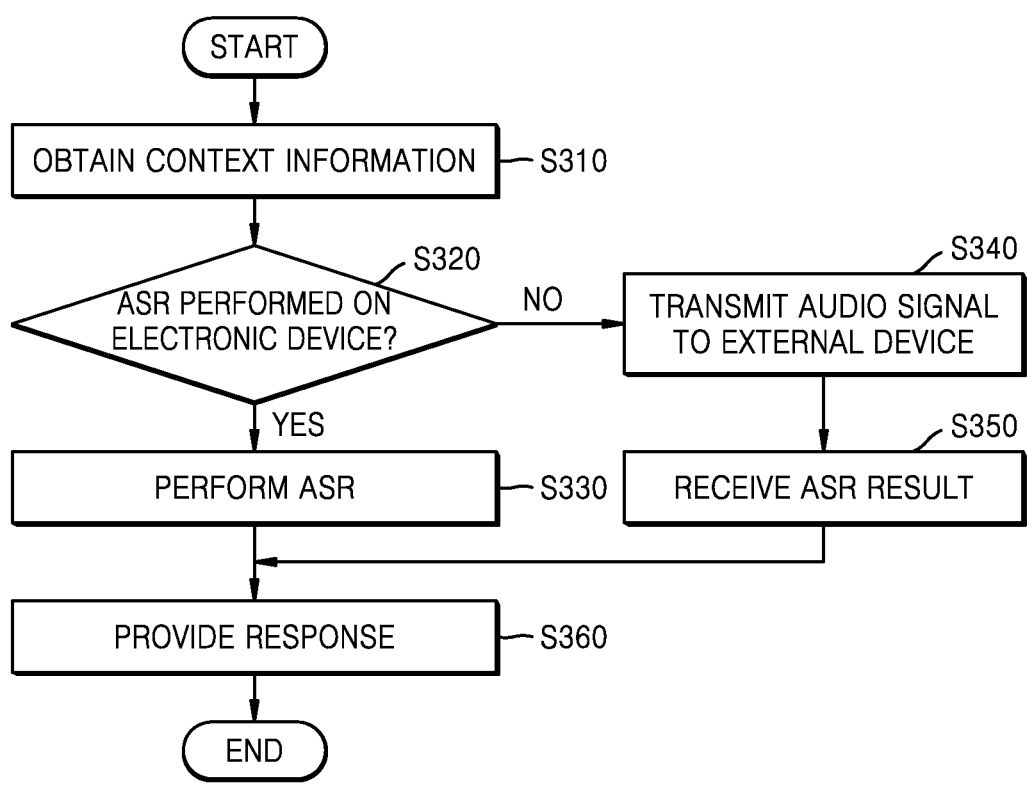
FIG. 3 is a flowchart of an operation method of an electronic device, according to an embodiment of the disclosure.

FIG. 3 is a flowchart of an operation method of an electronic device according to an embodiment of the disclosure.

Referring to FIG. 3, the electronic device 100 according to an embodiment of the disclosure may obtain context information in operation S310. For example, the context information may include information about a network connection state (or network connection state information) with the server 2000, location information of the electronic device 100, time information of the electronic device 100, ambient noise information of the electronic device 100, user's voice feature information, user's location information, etc.

The electronic device 100 according to an embodiment of the disclosure may receive a user's speech or utterance and convert the speech into an audio signal. In operation S320, the electronic device 100 may determine a device to perform ASR with respect to the user's speech or utterance, based on the context information obtained in operation S310. For example, the electronic device 100 may determine whether the electronic device 100 or the server 2000 is to perform the ASR, based on noise information such as a magnitude of ambient noise, an SNR, etc. The electronic device 100 may determine that the electronic device 100 is to perform the ASR when the magnitude of ambient noise is less than a preset value, and may determine that an external device (e.g., the server 2000) is to perform the ASR when the magnitude of ambient noise is greater than or equal to the preset value. When the electronic device 100 is not network-connected with the external device, the electronic device 100 may determine that the electronic device 100 is to perform the ASR. The electronic device 100 may determine that the server 2000 is to perform the ASR when a distance between the electronic device 100 and the user making the utterance is a preset distance or more. The electronic device 100 may also determine that the electronic device 100 is to perform the ASR when the magnitude of the ambient noise is less than or equal to the preset value or an SNR of the audio signal corresponding to the user's speech or utterance is greater than or equal to a preset value. On the other hand, when the magnitude of noise of the audio signal exceeds the preset value or the SNR of the audio signal is less than the preset value, the electronic device 100 may determine that the server 2000 is to perform the ASR.

The electronic device 100 may also determine that the server 2000 is to perform the ASR when the location information of the electronic device 100 is in a preset location or the time information of the electronic device 100 is a preset time. However, the selective determination of a device to perform audio processing is not limited to these examples.

In operation S340, the electronic device 100 may transmit the audio signal corresponding to the user's speech or utterance to the external device when the electronic device 100 determines that the external device is to perform the ASR in operation S320-NO.

The electronic device 100 may receive a result of the ASR from the external device in operation S350.

On the other hand, in operation S330, the electronic device 100 may perform ASR with respect to the audio signal when the electronic device 100 determines that the electronic device 100 is to perform the ASR in operation S320-YES.

For example, the electronic device 100 may obtain text data corresponding to the audio signal. The text data may include, but is not limited to, at least one string corresponding to a speech uttered by the user. The text data may be obtained by performing at least speech-to-text processing on the audio signal.

In operation S360, the electronic device 100 may provide a response to the user's speech or utterance based on a result of the ASR performed on the electronic device 100 in operation S330 or an ASR result received from an external device (e.g., the server 2000) having performed the ASR in operation S350.

For example, the electronic device 100 may generate the response to the user's speech or utterance by performing NLU, DM, NLG, TTS, etc., with respect to a result of the ASR, and display the generated response as a text or output the generated response as audio. The electronic device 100 may operate to perform a function corresponding to the response. However, the response provided by the electronic device 100 is not limited to these examples.

An operation method of the electronic device 100 according to an embodiment of the disclosure may be performed through interworking among a processor, an operating system (OS), and an application. Obtaining the noise information, such as the magnitude of noise or the SNR in operation S310, may be performed by a dedicated module in a processor. In this case, operations S320 to S360 may be performed under control of the OS or application instructions. However, a part of operation S330 may be performed by a dedicated module for a corresponding operation in the processor. When operations S320 to S360 are performed by execution of the OS or application instructions, an OS or application may be provided with a result of performing operation S310 to perform operations S320 to S360.

The operation method of the electronic device 100 according to an embodiment of the disclosure may be performed by execution of the OS or application instructions. In this case, each of operations S310 to S360 may be performed by execution of an instruction corresponding to each operation. Operations S310 to S360 may be performed by interworking between the OS and the application. In this case, operations S310 and S320 may be performed by the application instruction and operations S330 to S360 may be performed by the OS instruction. When the electronic device 100 determines that the electronic device 100 is to perform the ASR as a result of performing operation S320 through the application instruction, the application may execute an instruction for controlling execution of the OS instruction for performing operation S330. When the electronic device 100 determines that the server 2000 is to perform the ASR as a result of performing operation S320, the application may execute an instruction for controlling execution of the OS instruction for performing operation S340.

Figure 4:
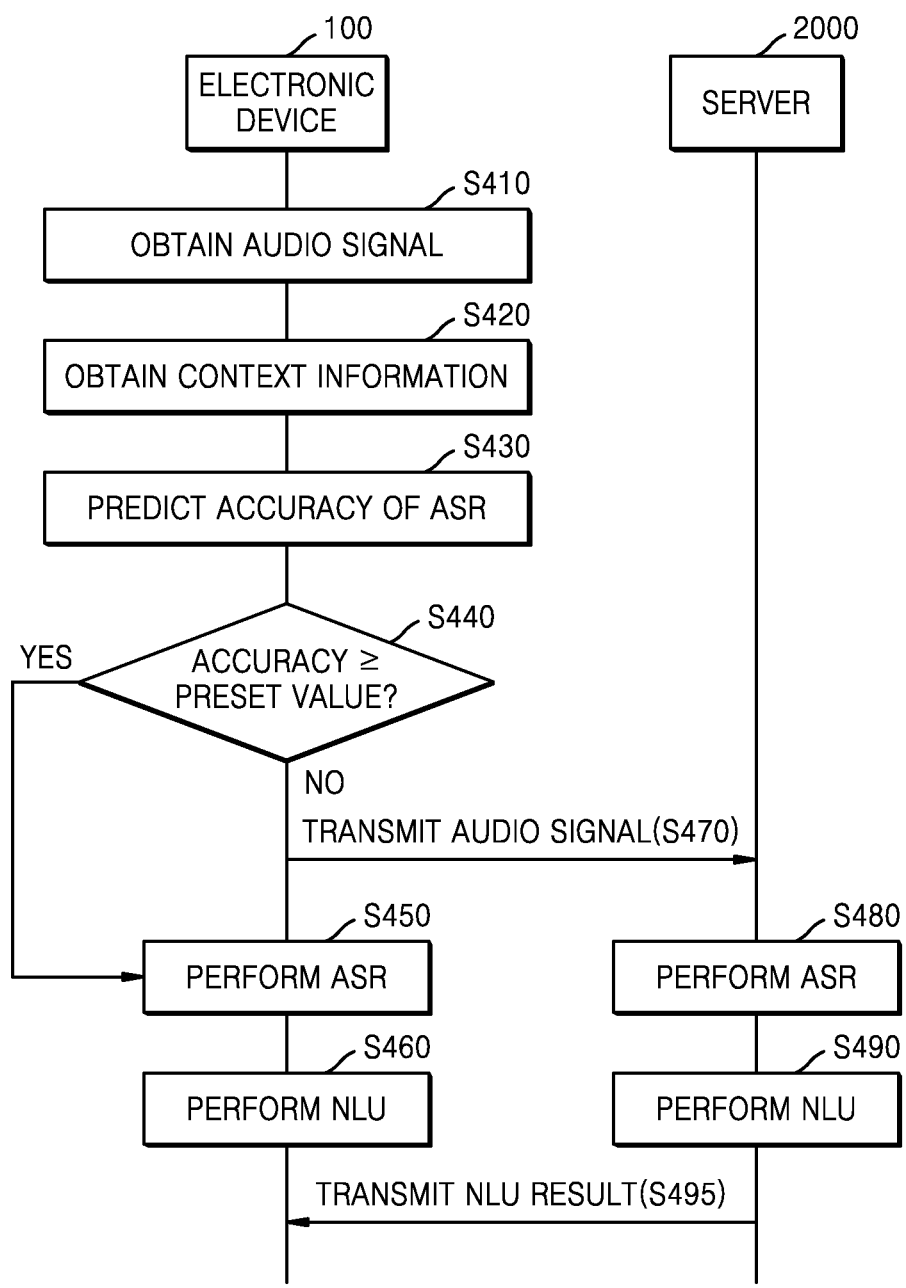
FIG. 4 is a flowchart of an operation method of an ASR system, according to an embodiment of the disclosure.

FIG. 4 is a flowchart of an operation method of an ASR system according to an embodiment of the disclosure.

Referring to FIG. 4, the ASR system may include the electronic device 100 and the server 2000. The server 2000 may be connected with the electronic device 100 through a network or short-range communication.

The electronic device 100 according to an embodiment of the disclosure may obtain an audio signal corresponding to a user's speech or utterance in operation S410.

For example, the user may make the speech or utterance with respect to the electronic device 100 according to an embodiment of the disclosure. The electronic device 100 may convert the user's speech or utterance into an audio signal that is a sort of an electrical signal, by using an audio input module. The user may also make the speech or utterance with respect to an external device (e.g., a smart watch paired with the electronic device 100) connected with the electronic device 100 through the network or short-range communication. The external device may convert the user's speech or utterance into the audio signal that is the electric signal by using an audio input module, and transmit the audio signal to the electronic device 100.

The electronic device 100 may obtain context information in operation S420. For example, the electronic device 100 may measure ambient environment information of the environment in which the electronic device 100 is present. The electronic device 100 may measure an ambient noise level by using a noise measurement sensor, etc. The electronic device 100 may also measure an SNR of the audio signal corresponding to the user's speech or utterance, obtain speech feature information of the user making the speech or utterance, or obtain a physical distance between the user and the electronic device 100. The location information and the time information of the electronic device 100 may be obtained. However, the context information is not limited to these examples.

As described with reference to FIG. 2, the electronic device 100 according to an embodiment of the disclosure may obtain ambient noise information of the electronic device 100 in pre-processing 201 with respect to the audio signal.

For example, when the electronic device 100 attenuates or removes noise, the electronic device 100 may obtain an SNR in which the SNR may be defined as a relative magnitude of a signal corresponding to the user's utterance with respect to a signal corresponding to the noise. The SNR may be generally measured in a decibel (dB) unit.

The SNR may be obtained when identifying the utterance period and the non-utterance period and removing the non-utterance period are performed. To identify the utterance period and the non-utterance period, a VAD technique may be used, and in this process, the SNR may be obtained during the utterance period. Information about the magnitude of the noise may be obtained during the non-utterance period and may be used in place of the SNR.

The electronic device 100 according to an embodiment of the disclosure may obtain noise information by using the entire audio signal input in pre-processing 201, and may obtain noise information by using a signal corresponding to a preset partial period of the audio signal or a signal corresponding to a preset point in time in the audio signal.

The electronic device 100 may obtain noise information from an audio signal from the point in time corresponding to start of pre-processing 201.

The electronic device 100 may obtain noise information from an audio signal input during a preset time period from the point in time corresponding to start of pre-processing 201. In another example, the electronic device 100 may obtain noise information from an audio signal input at a point in time after a lapse of a preset time from the point in time corresponding to start of pre-processing 201.

In particular, when the electronic device 100 identifies the utterance period and the non-utterance period and removes the non-utterance period in pre-processing 201, the electronic device 100 may obtain from the audio signal, noise information regarding a remaining portion of the entire signal from which the non-utterance period is removed. The electronic device 100 may also obtain noise information from a signal corresponding to a preset partial period of the non-utterance period and obtain noise information from a signal at a preset point in time of the non-utterance period.

When the electronic device 100 obtains noise information from a signal corresponding to a specific time period, the electronic device 100 may obtain noise information by using at least one of maximum values, median values, or average values of a magnitude of noise and a magnitude of the speech or utterance in the signal corresponding to the specific time period. The electronic device 100 may also obtain the noise information in this way when the electronic device 100 obtains the noise information from the input audio signal and when the electronic device 100 obtains the noise information from the signal corresponding to the utterance period. Also when the electronic device 100 obtains the noise information from the signal corresponding to the non-utterance period, the electronic device 100 may obtain the noise information by using at least one of the maximum value, the median value, or the average value of the magnitude of the noise in the signal corresponding to the non-utterance period.

In another embodiment of the disclosure, the noise information may include information about a pattern of noise. The pattern of the noise may mean a form in which the noise is distributed. An example of a form in which the noise may be distributed is a form in which the noise is uniformly distributed in the audio signal or the noise of a magnitude greater than or equal to a specific magnitude is distributed in a particular period of the audio signal. The accuracy of the ASR may vary with the form in which the noise is distributed.

The electronic device 100 may predict the accuracy of the ASR on the electronic device 100 based on the context information in operation S430. For example, the electronic device 100 may determine the accuracy of the ASR corresponding to an ambient noise level value by using a previously stored lookup table (e.g., a table matching an ASR accuracy value with a noise level). For example, the electronic device 100 may predict the accuracy of the ASR performed on the electronic device 100 to be low (e.g., an accuracy of 60%) when the measured ambient noise level is greater than or equal to a preset value (e.g., 70 dB).

Alternatively, the electronic device 100 may predict the accuracy of the ASR to be low (e.g., an accuracy of 50%) when the SNR of the audio signal is less than a preset value (e.g., 10 dB). However, the prediction of the ASR accuracy is not limited thereto, and the value of the accuracy of an ASR result corresponding to the ambient noise level or the value of the accuracy of the ASR corresponding to the SNR of the audio signal may differ with capabilities of hardware or software of the electronic device 100.

The electronic device 100 may predict the ASR result through a learnable model as well as the accuracy of the ASR result through the lookup table. The learnable model may be a model learned using a noise level and a predicted value of the accuracy of the ASR as learning data, and may be an AI model. The learnable model may include an accuracy prediction model that learns a result of the ASR performed on the electronic device 100 and noise information of an audio signal with respect to ASR and reflects unique characteristics of the electronic device 100 or unique characteristics of a user speech.

The electronic device 100 may determine whether the accuracy of the ASR predicted in operation S430 is greater than or equal to a preset value in operation S440, and may perform ASR with respect to the audio signal on the electronic device 100 in operation S450 when the predicted accuracy of the ASR is greater than or equal to the preset value (S440-YES). The electronic device 100 may perform NLU based on the result of the ASR in operation S460.

On the other hand, the electronic device 100 may transmit the audio signal to the server 2000 in operation S470, when the accuracy of the ASR is less than the preset value in operation S430 (S440-NO). The server 2000 may perform the ASR with respect to the received audio signal in operation S480, and perform the NLU based on the result of the ASR in operation S490. A result of the NLU performed on the server 2000 may be transmitted to the electronic device 100 in operation S495.

The electronic device 100 may perform the DM to determine an action corresponding to the user's speech or utterance based on the result of the NLU.

For example, as the result of the NLU, the electronic device 100 may search for information according to an extracted user's intention or determine a corresponding action such as controlling operations of hardware/software components included in the electronic device 100. The electronic device 100 may also determine an order of a plurality of actions as a response to the user's speech or utterance, when the plurality of actions are determined. However, the responses to the user's speech are not limited to these examples.

Figure 5:
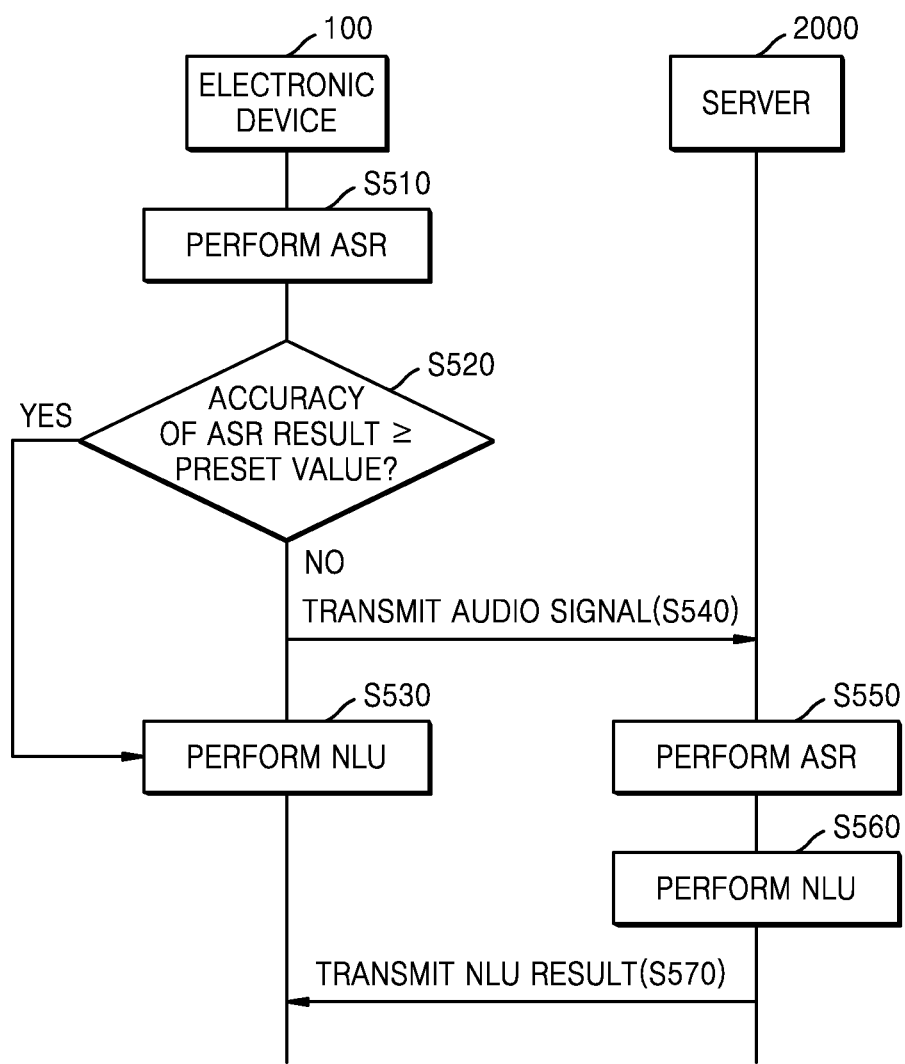
FIG. 5 is a flowchart of an operation method of an ASR system, according to an embodiment of the disclosure.

FIG. 5 is a flowchart of an operation method of an ASR system according to an embodiment of the disclosure.

Referring to FIG. 5, the electronic device 100 according to an embodiment of the disclosure may perform the ASR with respect to an audio signal in operation S510. For example, operation S510 of FIG. 5 may correspond to operation S450 of FIG. 4.

The electronic device 100 may determine an accuracy of an ASR result. For example, the ASR result may include reliability data. The electronic device 100 may determine the accuracy based on the reliability data.

When the accuracy (e.g., the reliability data) of the ASR result is greater than or equal to the preset value (S520-YES), the electronic device 100 may perform NLU including analyzing a meaning of the ASR result (e.g., text data) and generating a linguistic structure for the user's speech or utterance with a string included in the text data in operation S530.

On the other hand, when the accuracy of the ASR result (e.g., reliability data) is less than the preset value, the electronic device 100 may transmit the audio signal to the server 2000. The server 2000 may perform the ASR in operation S550 with respect to the received audio signal and may perform the NLU in operation S560 to convert the audio signal into text data and to analyze a meaning of the text data. The electronic device 100 may receive a result of the NLU from the server 2000 in operation S570.

The electronic device 100 may perform the DM to determine an action corresponding to the user's speech or utterance based on the result of the NLU.

Figure 6:
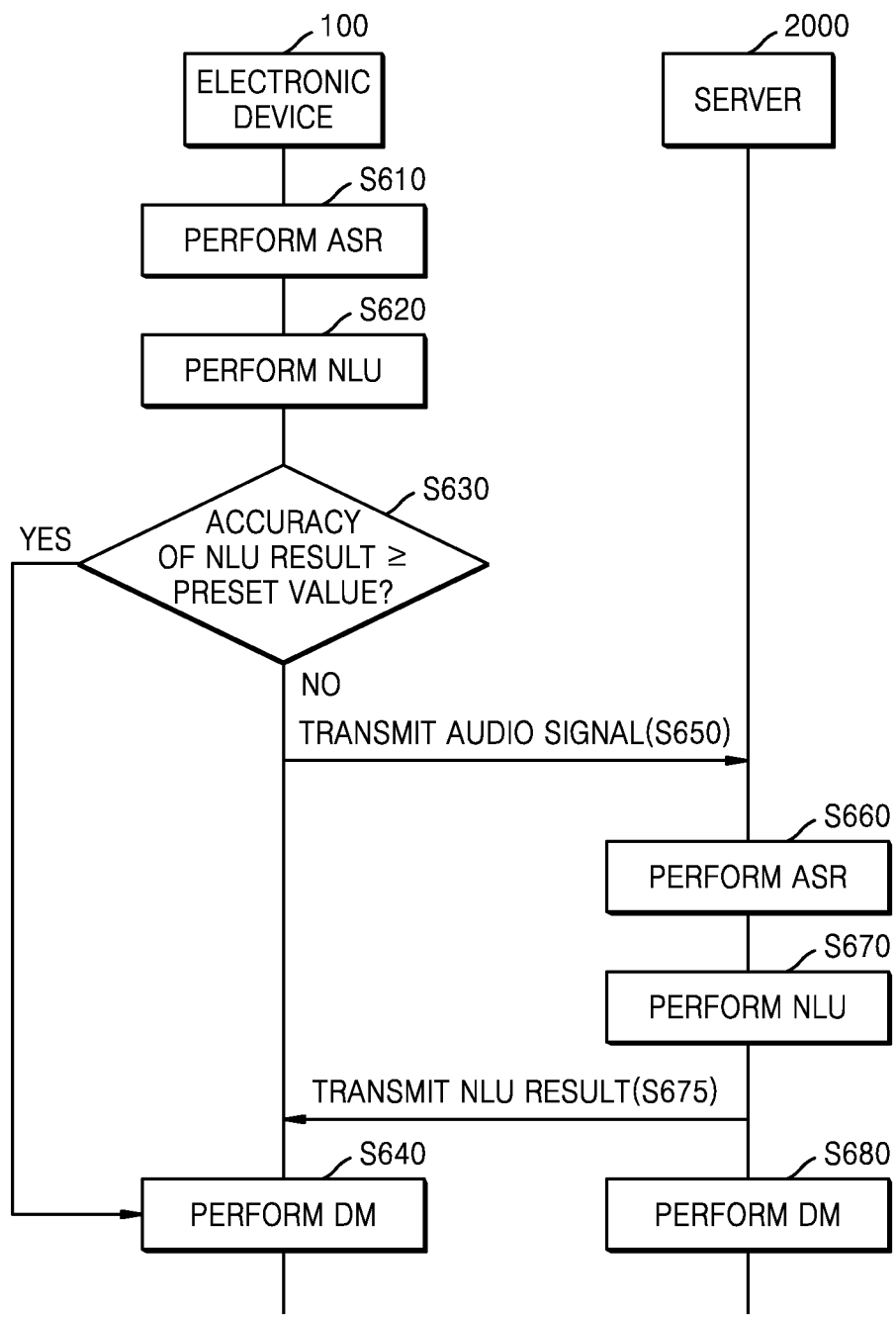
FIG. 6 is a flowchart of an operation method of an ASR system, according to an embodiment of the disclosure.

FIG. 6 is a flowchart of an operation method of an ASR system according to an embodiment of the disclosure.

Referring to FIG. 6, the electronic device 100 according to an embodiment of the disclosure may perform the ASR with respect to an audio signal in operation S610. For example, operation S610 of FIG. 6 may correspond to operation S450 of FIG. 4.

The electronic device 100 may perform the NLU to analyze a meaning of the text data obtained as the result of the ASR in operation S620.

The electronic device 100 may determine the accuracy of a result of the NLU that includes reliability data. The electronic device 100 may determine the accuracy of the result of the NLU based on the reliability data, in operation S630.

When the accuracy (e.g., the reliability data) of the result of the NLU is greater than or equal to the preset value (S630-YES), the electronic device 100 may perform the DM to determine at least one action corresponding to the user's speech or utterance based on the result of the NLU, in operation S640. For example, as the result of the NLU, the electronic device 100 may search for information according to an extracted user's intention or determine and perform a corresponding action, such as controlling operations of hardware/software components included in the electronic device 100. The electronic device 100 may also determine an order of a plurality of actions as a response to the user's speech or utterance, when the plurality of actions are determined. However, the operations of the NLU and DM are not limited to these examples.

On the other hand, when the accuracy of the NLU result (e.g., the reliability data) is less than the preset value (S630-NO), the electronic device 100 may transmit the audio signal to the server 2000 in operation S650. The server 2000 may perform the ASR with respect to the received audio signal in operation S660 and may perform the NLU to convert the audio signal into text data and to analyze a meaning of the text data in operation S670.

The server 2000 may perform the DM to determine an action corresponding to the user's speech or utterance based on the result of the NLU, in operation S680.

Alternatively, the electronic device 100 may receive the result of the NLU from the server 2000 in operation S675, and perform the DM to determine an action corresponding to the user's speech or utterance based on the result of the NLU received from the server 2000 in operation S640.

Figure 7:
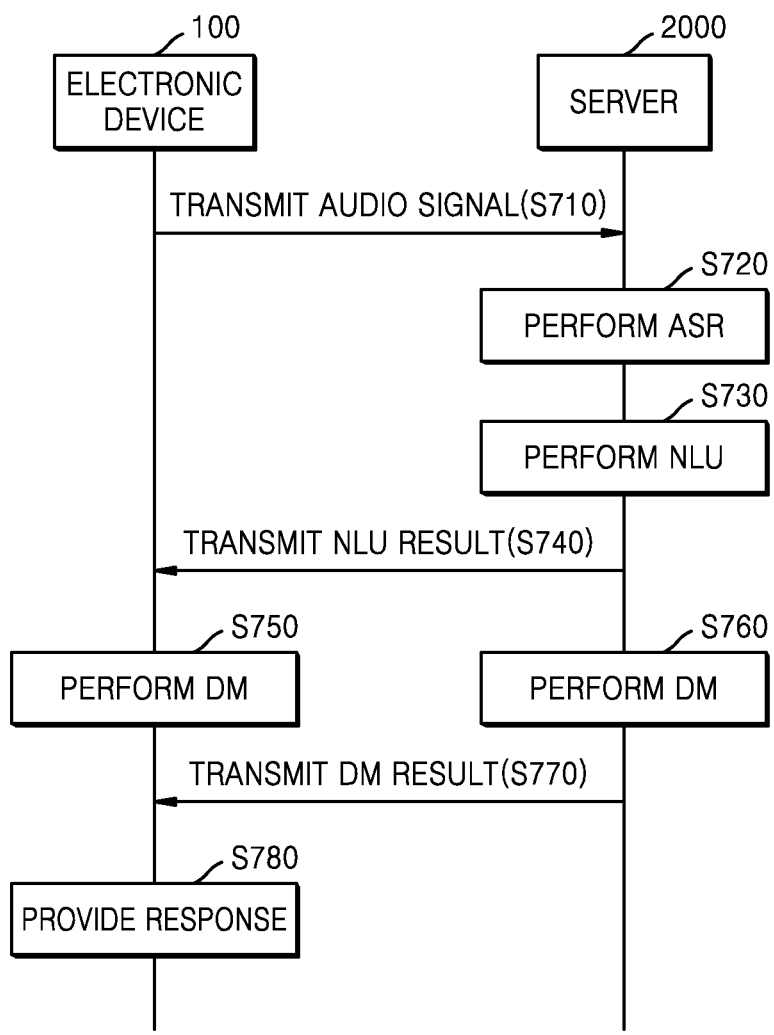
FIG. 7 is a flowchart of an operation method of an ASR system, according to an embodiment of the disclosure.

FIG. 7 is a flowchart of an operation method of an ASR system according to an embodiment of the disclosure.

Referring to FIG. 7, the electronic device 100 according to an embodiment of the disclosure may transmit an audio signal to the server 2000 in operation S710, and the server 2000 may perform ASR with respect to the received audio signal in operation S720. For example, operation S720 of FIG. 7 may correspond to operation S480 of FIG. 4.

The server 2000 may perform NLU to analyze a meaning of the text data obtained as the result of the ASR in operation S730.

The server 2000 may perform DM to determine at least one action corresponding to the user's speech or utterance based on the result of the NLU, in operation S760. For example, as the result of the NLU, the electronic device 100 may determine a corresponding action, such as searching for information according to an extracted user intention, and perform the determined corresponding action, thus transmitting a result of performing the action (e.g., an information search result) to the electronic device 100. However, the DM operations are not limited to these examples.

The electronic device 100 may receive the result of the NLU from the server 2000 in operation S740, and perform the DM to determine an action corresponding to the user's speech or utterance based on the received result of the NLU in operation S750. For example, the electronic device 100 may determine and perform a corresponding action such as controlling operations of hardware/software components included in the electronic device 100, according to a user's intention.

According to an embodiment of the disclosure, the electronic device 100 or the server 2000 may determine which of the electronic device 100 and the server 2000 is to perform DM, based on the result of NLU.

When the DM is performed on the server 2000 in operation S760, the server 2000 may transmit a result of the DM to the electronic device 100 in operation S770.

The electronic device 100 may provide a response to the user based on a result of the DM in operation S780. For example, the electronic device 100 may generate the response to the user's speech or utterance by performing NLG and TTS, etc., with respect to the result of the DM, and display the generated response as a text or output the generated response as audio. The electronic device 100 may operate to perform a function corresponding to the response.

Figure 8:
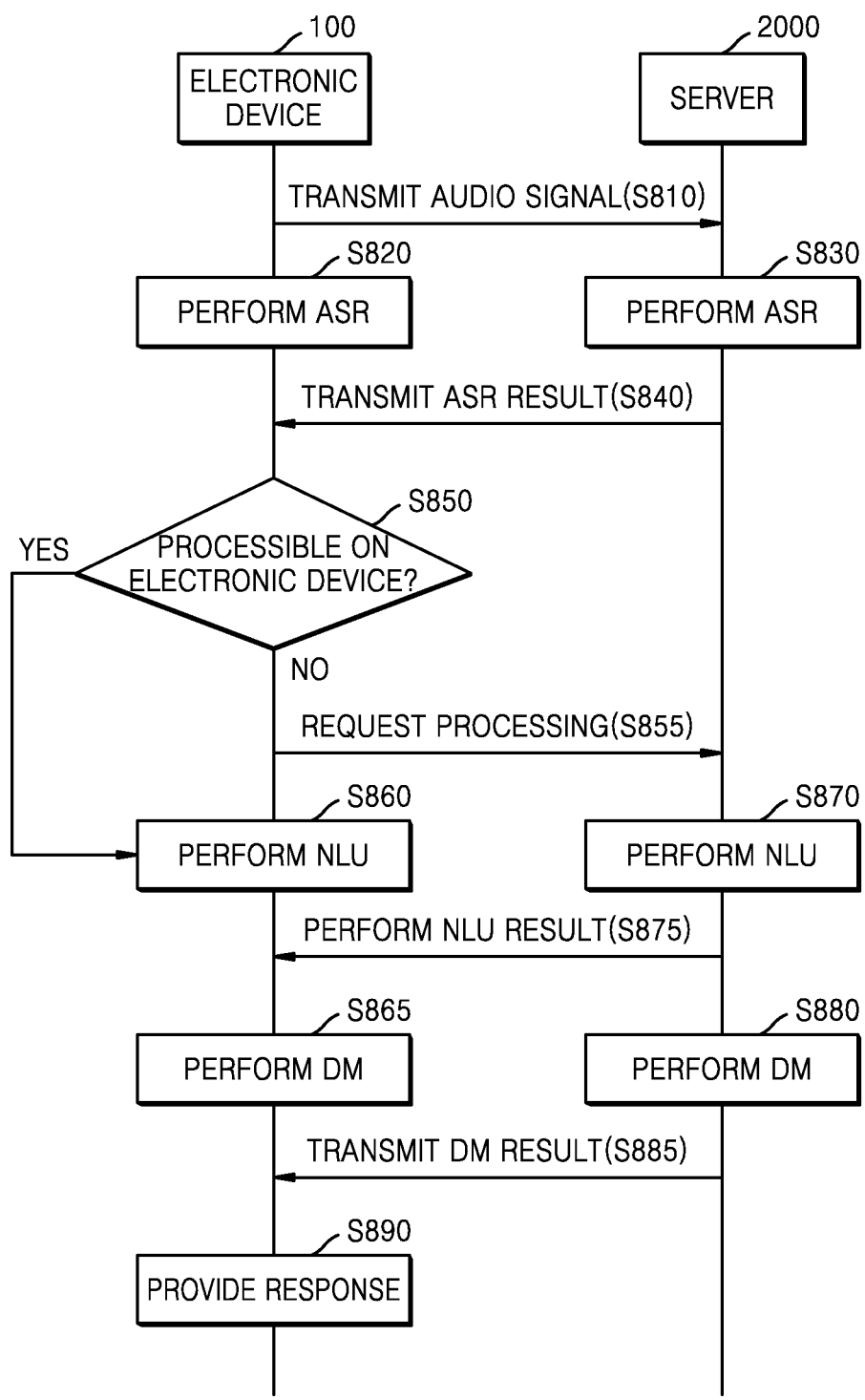
FIG. 8 is a flowchart of an operation method of an ASR system, according to an embodiment of the disclosure.

FIG. 8 is a flowchart of an operation method of an ASR system according to an embodiment of the disclosure.

Referring to FIG. 8, the electronic device 100 according to an embodiment of the disclosure may transmit an audio signal to the server 2000 in operation S810, and perform ASR with respect to the audio signal in operation S820, thus obtaining a first ASR result. The server 2000 may also perform ASR with respect to the audio signal received from the electronic device 100 in operation S830, thus obtaining a second ASR result. The server 2000 may transmit the second ASR result to the electronic device 100 in operation S840.

The electronic device 100 may determine based on the first ASR result whether NLU with respect to ASR is possible on the electronic device 100, in operation S850.

For example, when the accuracy of the first ASR result is low (the accuracy is less than a preset value), the accuracy of a result of the NLU performed using the first ASR result may be low.

When the accuracy of the first ASR result is high (the accuracy is greater than or equal to the preset value) (S850-YES), the electronic device 100 may perform the NLU using the first ASR result in operation S860 and perform DM in operation S865.

On the other hand, when the accuracy of the first ASR result is low (S850-NO), the electronic device 100 may transmit a processing request to the server 2000 in operation S855. Upon receiving the processing request from the electronic device 100, the server 2000 may perform the NLU based on the second ASR result in operation S870.

The server 2000 may perform the DM to determine at least one action corresponding to the user's speech or utterance based on the result of the NLU, in operation S880. For example, as the result of the NLU, the server 2000 may determine a corresponding action such as searching for information according to an extracted user intention and perform the determined corresponding action, thus transmitting a result of performing the action (e.g., an information search result) to the electronic device 100, in operation S885. However, the DM and NLU operations are not limited to these examples.

The electronic device 100 may receive the result of the NLU from the server 2000 in operation S875, and perform the DM to determine an action corresponding to the user's speech or utterance based on the received result of the NLU in operation S865. For example, the electronic device 100 may determine and perform a corresponding action such as controlling operations of hardware/software components included in the electronic device 100, according to a user's intention.

The electronic device 100 according to an embodiment of the disclosure may provide a response to the user, based on a result of the DM in operation S890. For example, the electronic device 100 may generate the response to the user's speech or utterance by performing NLG and TTS, etc., with respect to the result of the DM, and display the generated response as a text or output the generated response as audio. The electronic device 100 may operate to perform a function corresponding to the response.

Figure 9:
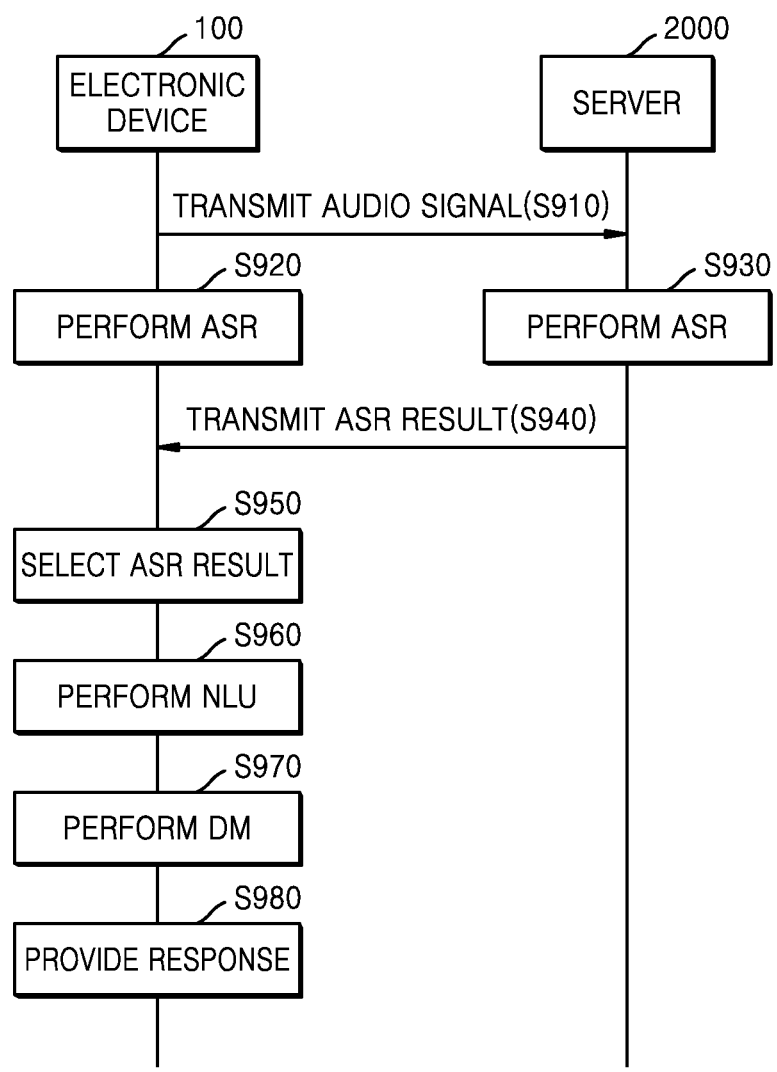
FIG. 9 is a flowchart of an operation method of an ASR system, according to an embodiment of the disclosure.

FIG. 9 is a flowchart of an operation method of an ASR system according to an embodiment of the disclosure.

Referring to FIG. 9, the electronic device 100 according to an embodiment of the disclosure may transmit an audio signal to the server 2000 in operation S910, and perform ASR with respect to the audio signal in operation S920, thus obtaining a first ASR result. The server 2000 may also perform the ASR with respect to the audio signal received from the electronic device 100 in operation S930, thus obtaining a second ASR result. The server 2000 may transmit the second ASR result to the electronic device 100 in operation S940.

The electronic device 100 may select one of the first ASR result and the second ASR result based on context information in operation S950. For example, when the ambient noise level is greater than or equal to a preset value, the electronic device 100 may compare reliability data regarding the first ASR result with reliability data regarding the second ASR result and select an ASR result having higher reliability.

When the ambient noise level is less than the preset value, the electronic device 100 may select one of the first ASR result and the second ASR result that is most quickly determined by the electronic device 100 and the server 2000. For example, taking account of a time required for the electronic device 100 to transmit an audio signal to the server 2000 and a time required for the server 2000 to transmit the second ASR result to the electronic device 100, the electronic device 100 may obtain the first ASR result before receiving the second ASR result from the server 200. However, the selection of the ASR result is not limited to this example.

Meanwhile, the electronic device 100 may select any one of the first ASR result and the second ASR result based on noise level information and also time information and/or location information of the electronic device 100, SNR information of the audio signal, utterance location information of the user, etc. For example, one or more selection criteria for selecting an ASR result may be determined based on the time information and location information of the electronic device 100, the SNR information of the audio signal, the utterance location information of the user, etc.

The electronic device 100 may perform NLU based on the selected ASR result in operation S960.

The electronic device 100 may perform DM to determine an action corresponding to the user's speech or utterance based on the result of the NLU, in operation S970.

The electronic device 100 may provide a response to the user's speech input based on a result of the DM in operation S980. For example, the electronic device 100 may generate the response to the user's speech or utterance by performing NLG and TTS, etc., with respect to the result of the DM, and display the generated response as a text or output the generated response as audio. The electronic device 100 may operate to perform a function corresponding to the response.

Figure 10:
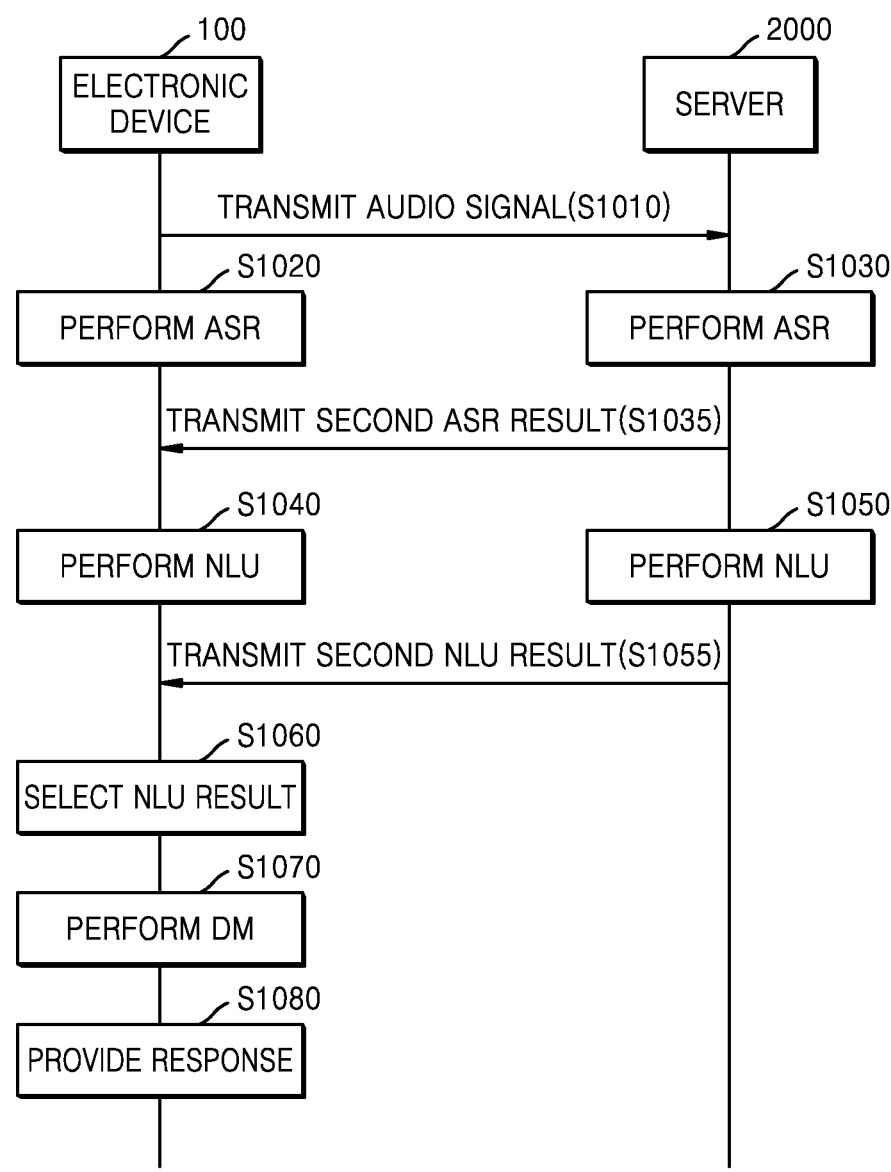
FIG. 10 is a flowchart of an operation method of an ASR system according to an embodiment of the disclosure.

FIG. 10 is a flowchart of an operation method of an ASR system according to an embodiment of the disclosure.

Referring to FIG. 10, the electronic device 100 according to an embodiment of the disclosure may transmit an audio signal to the server 2000 in operation S1010. The electronic device 100 may perform ASR with respect to the audio signal in operation S1020, thus obtaining a first ASR result. The server 2000 may also perform ASR with respect to the audio signal received from the electronic device 100 in operation S1030, thus obtaining a second ASR result. The server 2000 may transmit the second ASR result to the electronic device 100 in operation S1035.

The electronic device 100 may perform NLU based on the first ASR result in operation S1040, thus obtaining a first NLU result.

The server 2000 may perform NLU based on the second ASR result in operation S1050, thus obtaining a second NLU result. The server 2000 may transmit the second NLU result to the electronic device 100 in operation S1055.

The electronic device 100 may select one of the first NLU result and the second NLU result based on context information in operation S1060. For example, when the ambient noise level is greater than or equal to a preset value, the electronic device 100 may compare reliability data regarding the first NLU result with reliability data regarding the second NLU result and select an NLU result having higher reliability (that is, select the NLU result based on the reliability data). On the other hand, when the ambient noise level is less than the preset value, the electronic device 100 may select an NLU result that is most quickly determined (that is, select the NLU result based on a time when the NLU result is obtained). For example, taking account of a time required for the electronic device 100 to transmit an audio signal to the server 2000 and a time required for the server 2000 to transmit the second NLU result to the electronic device 100, the electronic device 100 may obtain the first NLU before receiving the second NLU result from the server 2000. However, the selection of the NLU result is not limited to this example.

Meanwhile, the electronic device 100 may select any one of the first NLU result and the second NLU result based noise level information and also time information and/or location information of the electronic device 100, SNR information of the audio signal, utterance location information of the user, etc. For example, a criterion for selecting an NLU result may be determined based on the time information and location information of the electronic device 100, the SNR information of the audio signal, the utterance location information of the user, etc.

The electronic device 100 may perform the DM to determine an action corresponding to the user's speech or utterance based on the selected result of the NLU, in operation S1070.

The electronic device 100 may provide a response to the user based on a result of the DM in operation S1080. For example, the electronic device 100 may generate the response to the user's speech or utterance by performing NLG and TTS, etc., with respect to the result of the DM, and display the generated response as a text or output the generated response as audio. The electronic device 100 may operate to perform one or more functions corresponding to the response.

Figure 11:
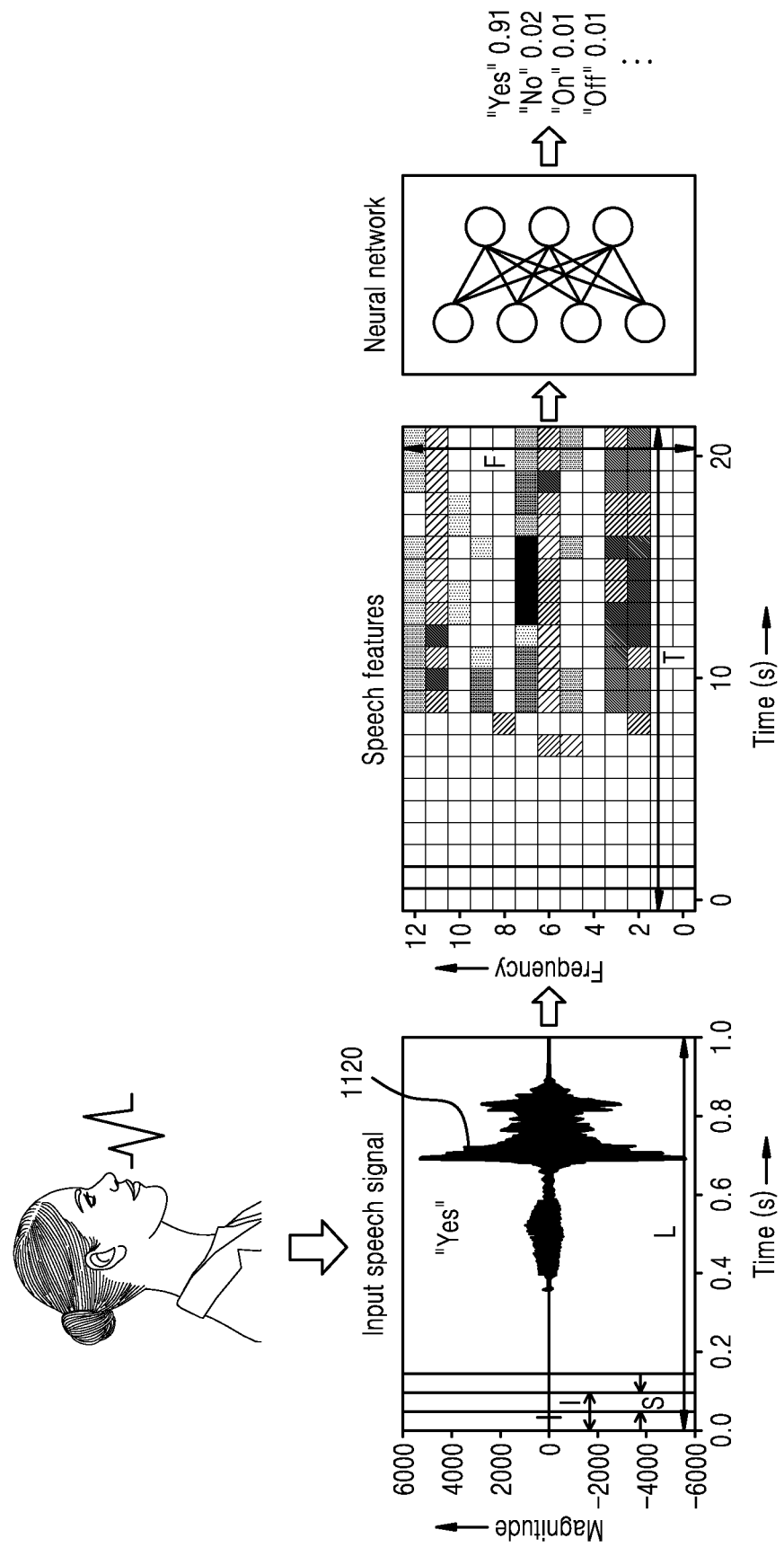
FIG. 11 is a diagram for describing a method, performed by an electronic device, of performing ASR based on a keyword included in a user's speech or utterance, according to an embodiment of the disclosure.

FIG. 11 is a diagram for describing a method, performed by an electronic device, of performing ASR based on a keyword included in a user's speech or utterance, according to an embodiment of the disclosure.

The electronic device 100 according to an embodiment of the disclosure may determine where the ASR or NLU is to be performed according to context information such as noise information, etc., and whether a particular keyword is recognized in the user's audio signal. For example, when the ambient noise level of the electronic device 100 is in a preset range (e.g., 50 to 70 dB), the electronic device 100 may determine whether the particular keyword is recognized in the audio signal. In this case, a technique such as keyword spotting may be used.

Referring to FIG. 11, the user may provide input of a speech or utterance that is detected by the electronic device 100. The electronic device 100 may convert the user's speech or utterance into an audio signal 1120 that is an electrical signal, and perform ASR with respect to the audio signal 1120. For example, the electronic device 100 may analyze the audio signal 1120 and extract a feature of the audio signal 1120. The electronic device 100 may determine a keyword corresponding to the audio signal by inputting the extracted feature to a neural network model learned using one or more neural networks. For example, when the feature of the audio signal is provided as input to the neural network model, the neural network model may output one or more keywords and reliability data corresponding to each of the keywords. For example, as shown in FIG. 11, a first keyword (e.g., "Yes") and first reliability data (e.g., 0.91) for the first keyword, a second keyword (e.g., "No") and second reliability data (e.g., 0.02) for the second keyword, a third keyword (e.g., "On") and third reliability data (e.g., 0.01) for the third keyword, and a fourth keyword (e.g., "Off") and fourth reliability data (e.g., 0.01) for the fourth keyword.

The electronic device 100 may determine one keyword corresponding to the audio signal 1120 by comparing reliability data for the keywords. For example, the electronic device 100 may select the first keyword (e.g., "Yes") having the highest reliability among the first through fourth keywords as the keyword corresponding to the audio signal 1120.

By comparing the keyword corresponding to the audio signal 1120 with a preset keyword, the electronic device 100 may determine whether the keyword corresponding to the audio signal 1120 is a preset keyword. For example, when the ambient noise level obtained in the electronic device 100 is in a preset range (e.g., 50 to 70 dB) and the keyword corresponding to the audio signal corresponds to the preset keyword, the electronic device 100 may determine that the electronic device 100 is to perform the ASR. However, the keyword processing is not limited to this example.

Meanwhile, the electronic device 100 may also determine that the electronic device 100 is to perform the ASR when the ambient noise level is less than a preset level as well as determine whether the electronic device 100 is to perform the ASR according to whether the ambient noise level is in the preset range. When the SNR is greater than or equal to a preset value, the electronic device 100 may determine that the electronic device 100 is to perform the ASR.

A preset ambient noise level when a preset keyword is determined to be input may be higher than a preset ambient noise level when the preset keyword is determined not to be input. For the determination based on the SNR instead of the noise level, a preset value of an SNR when the preset keyword is determined to be input may be lower than a preset value of an SNR when the preset keyword is determined not to be input. That is, when the preset keyword is input, ASR may be performed on the electronic device 100 even when a magnitude of ambient noise is greater than when the preset keyword is not input.

The electronic device 100 may compare a feature of an audio signal for a user's speech or utterance with a feature of a previously stored audio signal related to a particular keyword to determine a similarity between the two features, and determine that the user's speech or utterance corresponds to the particular keyword when the similarity is higher than a reference value. When the user's speech or utterance corresponds to the particular keyword and the ambient noise level is less than or equal to a preset level, the electronic device 100 may determine that the electronic device 100 is to perform the ASR. When the SNR is greater than or equal to a preset value, the electronic device 100 may determine that the electronic device 100 is to perform the ASR.

Figure 12:
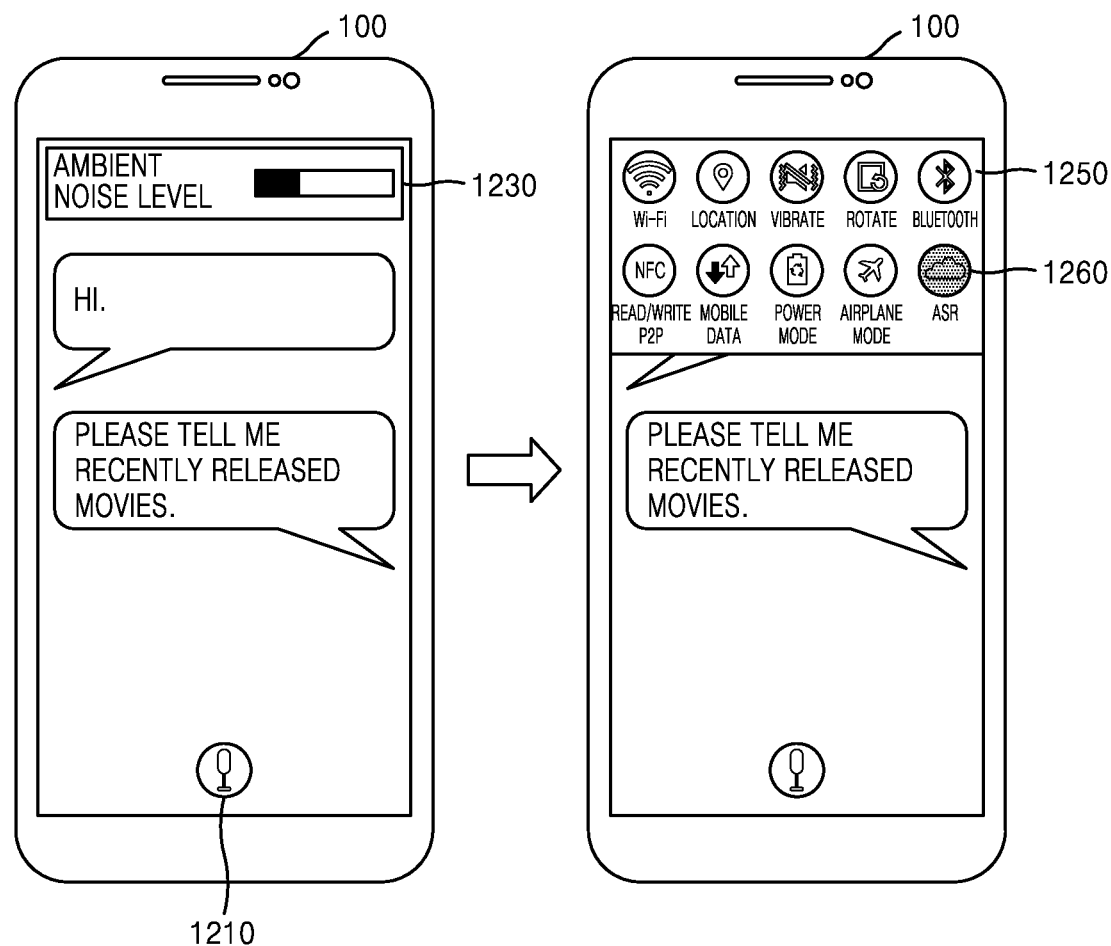
FIG. 12 is a diagram for describing a method, performed by an electronic device, of providing ASR-related setting, according to an embodiment of the disclosure.

FIG. 12 is a diagram for describing a method, performed by an electronic device, of providing an ASR-related setting, according to an embodiment of the disclosure.

Referring to FIG. 12, the electronic device 100 according to an embodiment of the disclosure may provide an interactive interface. The interactive interface may be an interface that receives an input (e.g., a voice input or a text input) from the user and provides an output response, in reply to the input of the user. For example, the interactive interface may include, but is not limited to, the virtual assistant, an AI assistant, etc.

The electronic device 100 according to an embodiment of the disclosure may receive a speech input from the user. For example, the user may provide a speech or utterance that is detected by the electronic device 100, together with or in sequence with an input (e.g., a touch input) to select a microphone icon 1210, to the electronic device 100. The electronic device 100 may measure the ambient noise level while receiving a speech input, and display the measured noise level. For example, the electronic device 100 may display an indicator 1230 indicating the noise level. However, the input of the user's speech and detection thereof are not limited thereto, and the noise level may be indicated in various ways.

The user may select a device to perform the ASR, based on the noise level. Referring to FIG. 12, the user may select a device to perform the ASR, by using an ASR icon 1260 included in a quick panel 1250. The quick panel 1250 may be, but is not limited to, a menu screen appearing by a touch or drag on an upper region of a screen of the electronic device 100.

For example, when the noise level is high, the ASR icon 1260 included in the quick panel 1250 may be deactivated based on a user input, thus setting ASR to be performed on the server 2000. On the other hand, when the noise level is low, the ASR icon 1260 included in the quick panel 1250 may be activated based on a user input, thus setting ASR to be performed on the electronic device 100. The input to enable or disable the ASR icon 1260 may be an input to select the ASR icon 1260, in which when the ASR icon 1260 in an active state is selected, the ASR icon 1260 may be switched to the inactive state, and when the ASR icon 1260 in the inactive state is selected, the ASR icon 1260 may be switched to the active state. The ASR icon 1260 in the active state may be highlighted as illustrated in FIG. 12, but the disposition of the ASR icon 1260 and user interface are not limited to the illustration.

Figure 13:
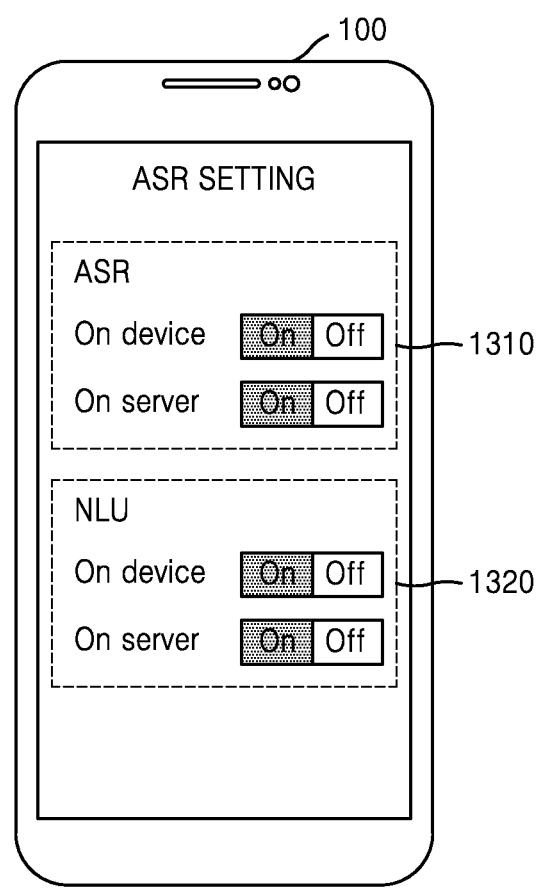
FIG. 13 illustrates an ASR setting screen according to an embodiment of the disclosure.

FIG. 13 illustrates an ASR setting screen according to an embodiment of the disclosure.

Referring to FIG. 13, the electronic device 100 according to an embodiment of the disclosure may provide a setting menu related to ASR. For example, as illustrated in FIG. 13, the setting menu may include an ASR setting menu 1310 and an NLU setting menu 1320.

The ASR setting menu 1310 may include an item for setting on which of the electronic device 100, the server 20000, and both the electronic device 100 and the server 2000 ASR is to be performed. For example, when "On device" is set to "On" and "On server" is set to "Off" in the ASR setting menu 1310, ASR may be performed on the electronic device 100.

On the other hand, when "On device" is set to "Off" and "On server" is set to "On" in the ASR setting menu 1310, ASR may be performed on the server 2000. Alternatively, when "On device" is set to "On" and "On server" is set to "On" in the ASR setting menu 1310, ASR may be performed on both the electronic device 100 and the server 2000. The electronic device 100 may also perform ASR on the electronic device 100 or the server 2000 based on context information of the electronic device 100. However, the ASR setting is not limited to this example.

The NLU setting menu 1320 may include an item for setting on which of the electronic device 100, the server 20000, and both the electronic device 100 and the server 2000 NLU is to be performed. For example, when "On device" is set to "On" and "On server" is set to "Off" in the NLU setting menu 1320, NLU may be performed on the electronic device 100.

On the other hand, when "On device" is set to "Off" and "On server" is set to "On" in the NLU setting menu 1320, NLU may be performed on the server 2000. Alternatively, when "On device" is set to "On" and "On server" is set to "On" in the NLU setting menu 1320, NLU may be performed on both the electronic device 100 and the server 2000. The electronic device 100 may also perform NLU on the electronic device 100 or the server 2000 based on context information of the electronic device 100. However, the NLU setting is not limited to this example.

Meanwhile, a setting menu related to ASR illustrated in FIG. 13 is merely an example, and an interface for setting the ASR and/or the NLU may be implemented in various ways.

Figure 14:
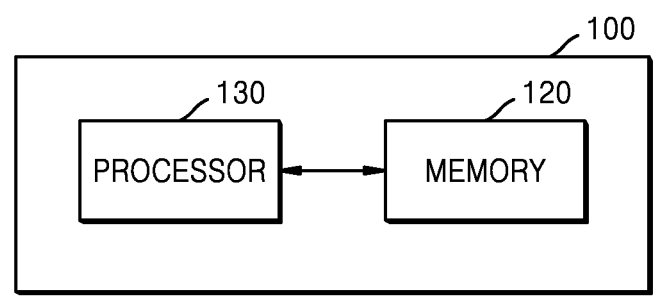
FIG. 14 is a block diagram of an electronic device according to an embodiment of the disclosure.

FIG. 14 is a block diagram of an electronic device according to an embodiment of the disclosure.

Referring to FIG. 14, the electronic device 100 according to an embodiment of the disclosure may include the processor 130 and the memory 120.

The processor 130 according to an embodiment of the disclosure may execute one or more programs stored in the memory 120. The processor 130 may include a single core, a dual core, a triple core, a quad core, and a core of any multiple thereof. The processor 130 may also include a plurality of processors. For example, the processor 130 may be implemented with a main processor and a sub processor which operates in a sleep mode.

The memory 120 according to an embodiment of the disclosure may store various data, programs, or applications for driving and controlling the electronic device 100. The memory 120 may store at least one of an ASR model, an NLU model, a DM model, an NLG model, or a TTS model to provide a response to a user's speech or utterance.

The programs stored in the memory 120 may include one or more instructions. The programs (for example, one or more instructions) or applications stored in the memory 120 may be executed by the processor 130.

The processor 130 according to an embodiment of the disclosure may obtain the context information by executing the one or more programs stored in the memory 120. For example, the context information may include information about a network connection state (or network connection state information) with the server 2000 according to an embodiment of the disclosure, location information of the electronic device 100, time information of the electronic device 100, ambient noise level information of the electronic device 100, user's voice feature information, user's location information, etc.

The processor 130 may determine a device to execute the ASR with respect to the user's speech or utterance, based on the obtained context information. For example, the processor 130 may determine based on an ambient noise level whether the electronic device 100 or the server 2000 is to perform the ASR. The processor 130 may determine that the electronic device 100 is to perform the ASR when the ambient noise level is less than a preset value, and may determine that an external device (e.g., the server 2000) is to perform the ASR when the ambient noise level is greater than or equal to the preset value. When the electronic device 100 is not network-connected with the external device, the processor 130 may determine that the electronic device 100 is to perform the ASR.

The processor 130 may extract a keyword included in the user's speech or utterance when the ambient noise level has a value in a preset range, and determine that the electronic device 100 is to perform the ASR when the extracted keyword is a preset keyword.

When the processor 130 determines that an external device (e.g., the server 2000) is to perform the ASR, the processor 130 may control an audio signal corresponding to the user's speech or utterance to be transmitted to the external device and control an ASR result to be received from the external device.

On the other hand, the processor 130 may perform ASR with respect to the audio signal when the electronic device 100 determines that the electronic device 100 is to perform the ASR.

The processor 130 may obtain the first ASR result by performing ASR with respect to the user's speech or utterance, receive the second ASR result from the external device, and select one of the first ASR result and the second ASR result.

The processor 130 may generate the response to the user's speech or utterance by performing NLU, DM, NLG, TTS, etc., based on a result of ASR. The processor 130 may display the generated response as a text or output the generated response as audio. The processor 130 may control execution of a function or multiple functions corresponding to the response.

Figure 15:
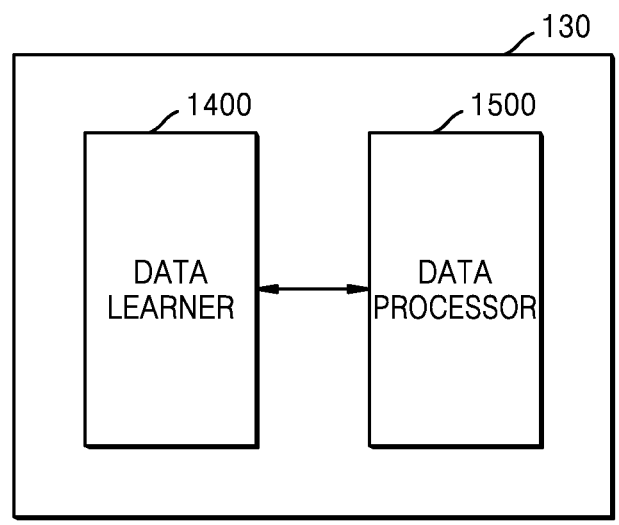
FIG. 15 is a block diagram of a processor according to an embodiment of the disclosure.

FIG. 15 is a block diagram of a processor according to an embodiment of the disclosure.

Referring to FIG. 15, the processor 130 according to an embodiment of the disclosure may include a data learner 1400 and a data processor 1500. The data learner 1400 and the data processor 1500 may be implemented as specialized hardware components on the processor 130. Alternatively, the data learner 1400 and the data processor 1500 may be implemented as hardware and/or software configured to execute functions.

The data learner 1400 may learn a criterion for determining a response corresponding to a user's speech or utterance according to an embodiment of the disclosure. For example, the data learner 1400 may learn a criterion for learning at least one of an ASR model, an NLU model, a DM model, an NLG model, or a TTS model. For example, the data learner 1400 may learn a criterion for converting an audio signal into text data to learn the ASR model. The data learner 1400 may learn a criterion for identifying a user's intention from text data to learn the NLU model. The data learner 1400 may learn a criterion for determining an action corresponding to the user's speech or utterance to learn the DM model.

The data processing models (e.g., the ASR model, the NLU model, the DM model, the NLG model, and the TTS model) may be established considering an application field of the data processing model, a purpose of learning, computer capabilities of a device, etc. The data processing models may be AI models.

The data learner 1400 may learn the data processing models by using a learning algorithm, etc., including error back-propagation or gradient descent.

The data learner 1400 causes the data processing model to learn using supervised learning having learning data as an input value. The data learner 1400 may cause the data processing model to learn using unsupervised learning in which the data processing model discovers a criterion for data processing by learning a type of data needed for data processing without separate supervision. The data learner 1400 may learn the data processing model by using reinforcement learning based on a feedback regarding whether a result based on learning is correct.

Once the data processing model is learned, the data learner 1400 may store the learned data processing model. In this case, the data learner 1400 may store the learned data processing models in the memory of the electronic device. Alternatively, the data learner 1400 may store the learned data processing model in a memory of a server, memory, or other device connected to the electronic device 100.

In this case, the memory in which the learned data processing model is stored may also store a command or data related to at least one other element of the electronic device 100. The memory may also store software and/or programs. The program may include a kernel, middleware, an application programming interface (API), and/or an application program (or "application"), and the like.

The data processor 1500 may provide the response to the user's speech or utterance by using the learned data processing models (e.g., the ASR model, the NLU model, the DM model, the NLG model, and the TTS model).

At least one of the data learner 1400 or the data processor 1500 may be manufactured in the form of at least one hardware chip and mounted on an electronic device. For example, at least one of the data learner 1400 or the data processor 1500 may be manufactured in the form of a dedicated hardware chip for AI, or may be manufactured as a part of an existing general-purpose processor (e.g., a central processing unit (CPU), or an application processor) or a dedicated graphic processor (e.g., a graphic processing unit (GPU)) and implemented on various electronic devices.

In this case, the data learner 1400 and the data processor 1500 may be implemented on one electronic device and on separate electronic devices. For example, one of the data learner 1400 and the data processor 1500 may be included in one electronic device, and the other may be included in a server. The data learner 1400 and the data processor 1500 may be communicatively connected in a wired or wireless manner, such that model information established by the data learner 1400 may be provided to the data processor 1500 or data input to the data processor 1500 may be provided to the data learner 1400 as additional learning data.

Meanwhile, at least one of the data learner 1400 or the data processor 1500 may be implemented with a software module. When at least one of the data learner 1400 or the data processor 1500 may be implemented with a software module (or a program module including an instruction), the software module may be stored in a non-transitory computer-readable medium, which may be memory or other micro processing resources of the processor 130. In this case, at least one software module is provided by an OS or by an application. Alternatively, a part of the at least one software module may be provided by an OS and another part thereof may be provided by an application.

A function related to AI according to the disclosure is performed through a processor and a memory. The processor may include a microprocessor, one processor or a plurality of processors. In this case, one processor or a plurality of processors may include a general-purpose processor such as a CPU, an application processor (AP), a digital signal processor (DSP), etc., a graphic-dedicated processor such as a GPU, a vision processing unit (VPU), etc., and an AI-dedicated processor such as a neural processing Unit (NPU). One processor or a plurality of processors may control data to be processed according to a predefined operation rule or AI model stored in the memory. When one processor or a plurality of processors include an AI-dedicated processor, the AI-dedicated processor may be designed as a hardware structure specialized for processing a specific AI model.

The predefined operation rule or AI model may be optimized through learning. Herein, when the predefined operation rule or AI model is optimized through learning, a basic AI model is trained by a learning algorithm by using multiple learning data to execute desired characteristics (or purpose), thus making the predefined operation rule or AI model. Such learning may be performed by a device on which AI according to the disclosure is implemented or by a separate server and/or a system. Examples of a learning algorithm may include, but are not limited to, supervised learning, unsupervised learning, semi-supervised learning, or reinforcement learning.

An AI model may include a plurality of neural network layers. Each of the plurality of neural network layers may have a plurality of weight values, and a neural network operation is performed using an operation result of a previous layer and an operation among the plurality of weight values. The plurality of weight values of the plurality of neural network layers may be optimized by a learning result of the AI model. For example, the plurality of weight values may be updated to reduce or minimize a loss value or a cost value obtained in the AI model during learning. Examples of the AI neural network may include, but are not limited to, a deep neural network (DNN), a convolutional neural network (CNN), a recurrent neural network (RNN), a restricted Boltzmann machine (RBM), a deep belief network (DBN), a bidirectional recurrent deep neural network (BRDNN), and a deep Q-network.

Figure 16:
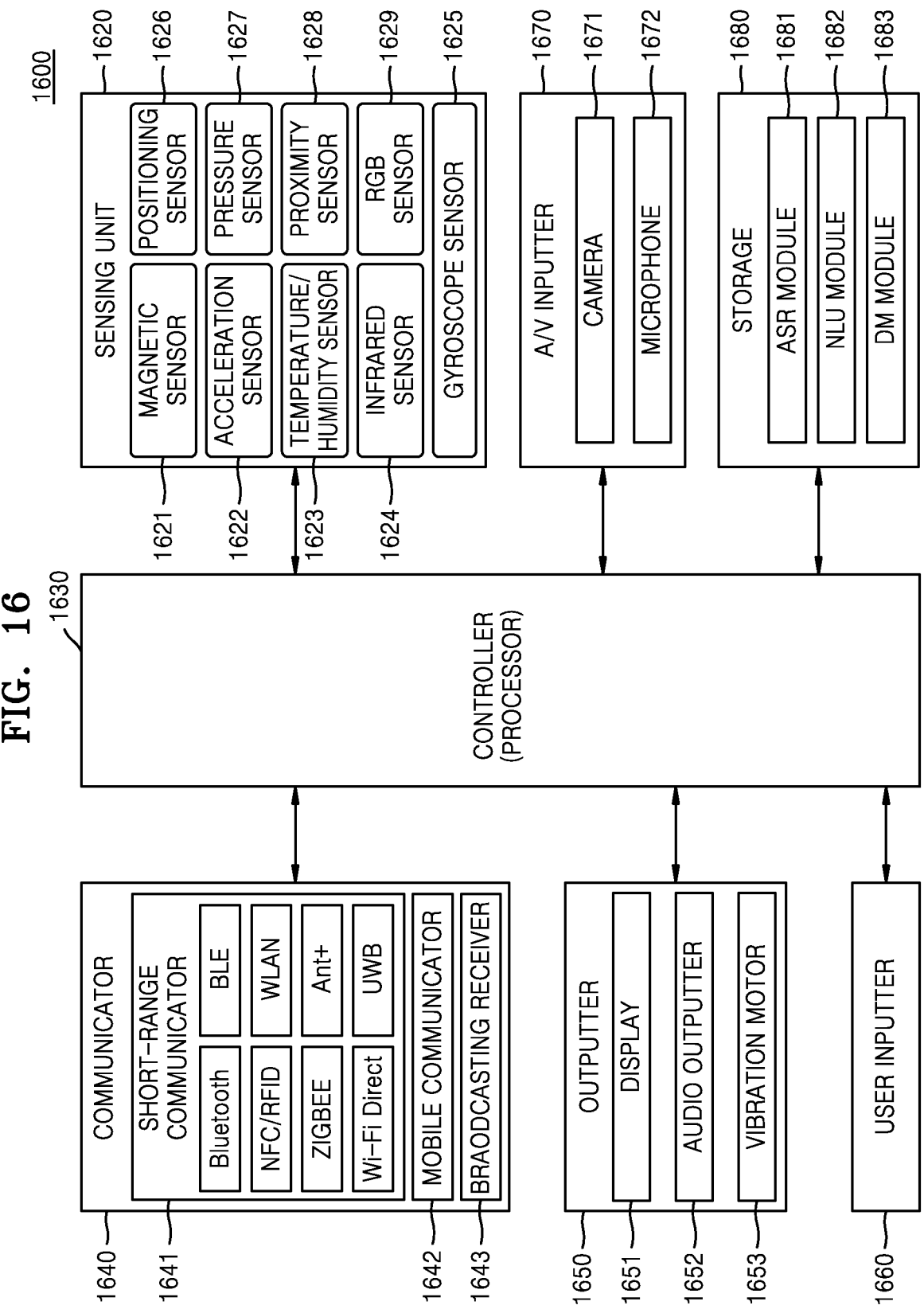
FIG. 16 is a block diagram of an electronic device according to an embodiment of the disclosure.

FIG. 16 is a block diagram of an electronic device according to an embodiment of the disclosure. An electronic device 1600 shown in FIG. 16 may be an example of the electronic device 100 shown in FIG. 1.

Referring to FIG. 16, the electronic device 1600 according to an embodiment of the disclosure may include a controller 1630, a sensing unit 1620, a communicator 1640, an outputter 1650, a user inputter 1660, an audio/video (AN) inputter 1670, and a storage 1680.

The controller 1630 of FIG. 16 may correspond to the processor 130 of FIG. 14, and the storage 1680 of FIG. 16 may correspond to the memory 120 of FIG. 14. Redundant descriptions with respect to such components are omitted.

The communicator 1640 may include one or more components for performing communication between the electronic device 1600 and the external device (e.g., a server, etc.). For example, the communicator 1640 may include a short-range wireless communicator 1641, a mobile communicator 1642, and a broadcasting receiver 1643. The electronic device 1600 according to an embodiment of the disclosure may transmit an audio signal to the server by using the communicator 1640. For example, the controller 1630 may transmit the audio signal corresponding to the user's speech or utterance to the server by controlling the communicator 1640.

The short-range wireless communicator 1641 may include, but is not limited to, a Bluetooth communicator, a near field communication (NFC) unit, a wireless local area network (WLAN) communicator, a ZigBee communicator, an infrared Data Association (IrDA) communicator, a WiFi Direct (WFD) communicator, an ultra wideband (UWB) communicator, and an Ant+communicator.

The mobile communicator 1642 transmits a radio signal to and receives a radio signal from at least one of a base station, an external terminal, or a server over a mobile communication network. Herein, the radio signal may include various forms of data corresponding to transmission/reception of a voice call signal, a video communication call signal, or a text/multimedia message.

The broadcasting receiver 1643 receives a broadcast signal and/or broadcasting-related information from an external source through a broadcasting channel. The broadcasting channel may include a satellite channel and a terrestrial channel. According to implementation examples, the electronic device 1600 may not include the broadcasting receiver 1643.

The outputter 1650 may output an audio signal, a video signal, or a vibration signal, and may include a display 1651, an audio outputter 1652, a vibration motor 1653, and so forth. The electronic device 1600 according to an embodiment of the disclosure may output the response to the user's speech or utterance by using the outputter 1650. For example, the response to the user's speech or utterance may be generated in the form of an audio signal or a video signal and may be output through the display 1651 or the audio outputter 1652.

The display 1651 converts an image signal, a data signal, an on-screen display (OSD) signal, a control signal, or the like, processed by the controller 1630, to generate a driving signal for displaying an image to the user. The display 1651 may be implemented with a plasma display panel (PDP), a liquid crystal display (LCD), an organic light-emitting diode (OLED), a flexible display, or the like, and may also be implemented with a three-dimensional (3D) display. The display 1651 may include a touch screen and thus may be used as an input device as well as an output device.

The audio outputter 1652 may output audio data received from the communicator 1640 or stored in the storage 1680. The audio outputter 1652 may output an audio signal related to a function (e.g., a call signal receiving sound, a message receiving sound, an alarm sound, etc.) performed on the electronic device 1600. The audio outputter 1652 may include a speaker, a buzzer, or the like.

The vibration motor 1653 may output a vibration or haptic signal. For example, the vibration motor 1653 may output a vibration signal corresponding to output of audio data or video data (e.g., a call signal receiving sound, a message receiving sound, etc.). The vibration motor 1653 may output a vibration signal when a touch is input to a touch screen.

The controller 1630 may control an overall operation of the electronic device 1600. For example, the controller 1630 may control in overall the communicator 1640, the outputter 1650, the user inputter 1660, the sensing unit 1620, or the AN inputter 1670, by executing programs stored in the storage 1680.

The user inputter 1660 may be an interface through which a user inputs data for controlling the electronic device 1600. For example, the user inputter 1660 may include, but is not limited to, a keypad, a dome switch, a touch pad (a capacitive overlay type, a resistive overlay type, an infrared beam type, a surface acoustic wave type, an integral strain gauge type, a piezoelectric effect type, etc.), a jog wheel, a jog switch, etc. The user inputter 1660 according to an embodiment of the disclosure may include a touch pad for receiving an input of the user to select an icon displayed on the display 1651 in an embodiment of the disclosure that receives a preset input described in FIG. 2. The user inputter 1660 may include a keypad, a physical button such as a dome switch, etc.

The sensing unit 1620 may include a sensor for sensing a state of the electronic device 1600 or an ambient state of the electronic device 1600 as well as a sensor for sensing user's biometric information. The sensing unit 1620 may deliver information sensed by the sensor 1621-1629 to the controller 1630.

The sensing unit 1620 may include, but is not limited to, at least one of a magnetic sensor 1621, an acceleration sensor 1622, a temperature/humidity sensor 1623, an infrared sensor 1624, a gyroscope sensor 1625, a positioning sensor (e.g., a global positioning system (GPS)) 1626, a pressure sensor 1627, a proximity sensor 1628, or a red/green/blue (RGB) sensor (or an illuminance sensor) 1629. A function of each sensor is understood by the ordinary artisan from a name of each sensor, and thus will not be described in detail. The sensing unit 1620 according to an embodiment of the disclosure may include a noise measurement sensor.

The A/V inputter 1670 may receive input of an audio signal or a video signal, and may include a camera 1671, a microphone 1672, and so forth. The camera 1671 may obtain an image frame such as a still image or a moving image in a video communication mode or a photographing mode through an image sensor. The image captured by the image sensor is processed by the controller 1630 or a separate image processor.

An image frame processed by the camera 1671 may be stored in the storage 1680 or transmitted to an external source through the communicator 1640. Two or more cameras 1671 may be provided according to a structure aspect of the electronic device 1600.

The microphone 1672 may receive an external audio signal and process the received signal into electric voice data. For example, the microphone 1672 may receive an audio signal from an external device or a speaker. The microphone 1672 according to an embodiment of the disclosure may be used to obtain input of the audio signal corresponding to the user's speech or utterance. The microphone 1672 may use various noise cancellation algorithms for canceling noise generated during reception of the external audio signal. An algorithm for cancelling noise of the microphone 1672 may be used in a pre-processing stage according to an embodiment of the disclosure.

The storage 1680 may store a program for processing and control of the electronic device 1600 by the controller 1630, and store input/output data (e.g., an application, content, time-zone information of an external device, an address book, etc.). Among operations of the electronic device according to an embodiment of the disclosure, an operation performed by an OS or an application may be stored in the form of a program in the storage 1680. To perform a corresponding operation, a program may be loaded in the storage 1680. When the program is stored and when the program is loaded, different types of memories may be used.

The storage 1680 may include a storage medium of at least one type of a flash memory type, a hard disk type, a multimedia card micro type, a card type memory (e.g., a secure digital (SD) or extreme digital (XD) memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disk, and so forth. The electronic device 1600 may operate a web storage or a cloud server that performs a storage function of the storage 1680 on the Internet.

The programs stored in the storage 1680 may be classified into a plurality of modules depending on a function thereof, and the storage 1680 may include, for example, an ASR module 1681, an NLU module 1682, a DM module 1683, an NLG module, and a TTS module. ASR, NLU, DM, NLG, and TTS have already been described above with reference to FIG. 2, and thus redundant operations of the modules will not be described.

Meanwhile, the ASR module 1681 may include an ASR model, the NLU module 1682 may include an NLU model, the DM module 1683 may include a DM model, the NLG module may include an NLG model, and the TTS module may include a TTS model. In this case, at least one of the ASR model, the NLU model, the DM model, the DM model, the NLG model, or the TTS model may be based on a neural network. For example, a model such as, but is not limited to, a DNN, an RNN, a BRDNN, or the like may be used as the data processing model.

The storage 1680 may further include a UI module, a touch screen module, a notification module, etc.

The UI module may provide a specialized UI or graphic UI (GUI) interworking with the electronic device 1600 for each application. A touch screen module may sense a touch gesture of a user on a touch screen, such as the display 1651, and delivers information about the touch gesture to the controller 1630. When an icon is displayed or a response is displayed in a GUI form on the display according to an embodiment of the disclosure, the UI module may be used.

The touch screen module may recognize and analyze a touch code. The touch screen module may be configured with separate hardware including a controller.

The notification module may generate a signal for notifying an occurrence of an event of the electronic device 1600. Examples of the event occurring in the electronic device 1600 may include call signal reception, message reception, key signal input, schedule notification, and so forth.

Meanwhile, the block diagrams of the electronic devices 100 and 1600 shown in FIGS. 14 and 16, respectively, are block diagrams for an embodiment of the disclosure. Elements of the block diagram may be integrated, added, or omitted depending on the implemented specifications of the electronic devices 100 and 1600. That is, when needed, two or more elements may be integrated into one element or one element may be divided into two or more elements. A function executed in each element (or module) is intended to describe embodiments of the disclosure, and a detailed operation or apparatus thereof does not limit the scope of the disclosure.

Figure 17:
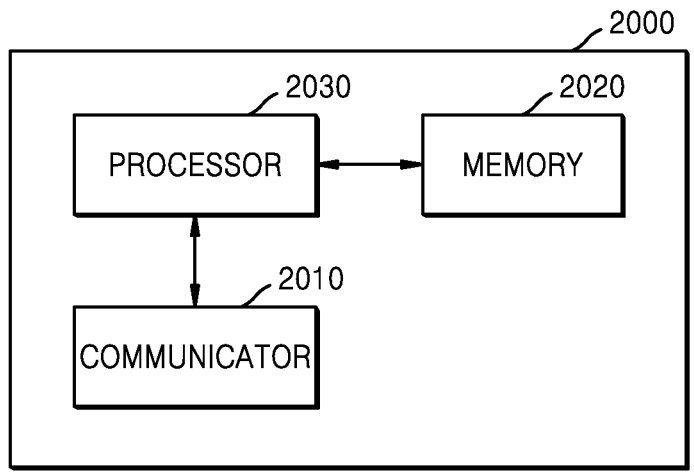
FIG. 17 is a block diagram of a server according to an embodiment of the disclosure.

FIG. 17 is a block diagram of a server according to an embodiment of the disclosure.

Referring to FIG. 17, the server 2000 according to an embodiment of the disclosure may include a communicator 2010, a processor 2030, and a memory 2020.

The communicator 2010 may transmit data or a signal to an external device or an external server, and receive data or signals from the external device or the external server, under control of the processor 2030. The communicator 2010 according to an embodiment of the disclosure may transmit and receive data or a signal by performing communication with an electronic device according to an embodiment of the disclosure. For example, the communicator 2010 may receive the user's audio signal from the electronic device and transmit a result of performing the ASR with respect to the audio signal (ASR result), a result of performing NLU (NLU result), a result of performing DM (DM result), etc., to the electronic device.

The communicator 2010 may include one or more components for enabling communication through a local area network (LAN), a wide area network (WAN), a value-added network (VAN), a mobile radio communication network, a satellite communication network, and a combination thereof. The communicator 2010 may wirelessly transmit and receive data or a signal directly to and from an external device or an external server by using a WLAN (e.g., WiFi), etc.

The processor 2030 according to an embodiment of the disclosure may control operations of the server 2000. The processor 2030 according to an embodiment of the disclosure may execute one or more programs stored in the memory 2020. The memory 2020 according to an embodiment of the disclosure may store various data, programs, or applications for driving and controlling the server 2000. The programs stored in the memory 2020 may be classified into a plurality of modules according to functions thereof. For example, the memory 2020 may include an ASR module for performing ASR, an NLU module for performing NLU, and a DM module for performing DM. The ASR module may include an ASR model, the NLU module may include an NLU model, and the DM module may include a DM model. In this case, at least one of the ASR model, the NLU model, or the DM model may be based on a neural network. For example, a model such as, but not limited to, a DNN, an RNN, a BRDNN, or the like may be used as the data processing model.

The programs stored in the memory 2020 may include one or more instructions, and the programs (for example, one or more instructions) or applications stored in the memory 2020 may be executed by the processor 2030.

The processor 2030 according to an embodiment of the disclosure may perform at least one of ASR, NLU, or DM based on the audio signal received from the electronic device. For example, the processor 2030 may obtain text data corresponding to the audio signal by using the ASR model stored in the memory 2020. The processor 2030 may recognize a meaning of the speech or utterance (e.g., the user's intention) by using the NLU model. The processor 2030 may determine an action corresponding to the user's speech or utterance according to the extracted user's intention based on an NLU result by using the DM model.

Figure 18:
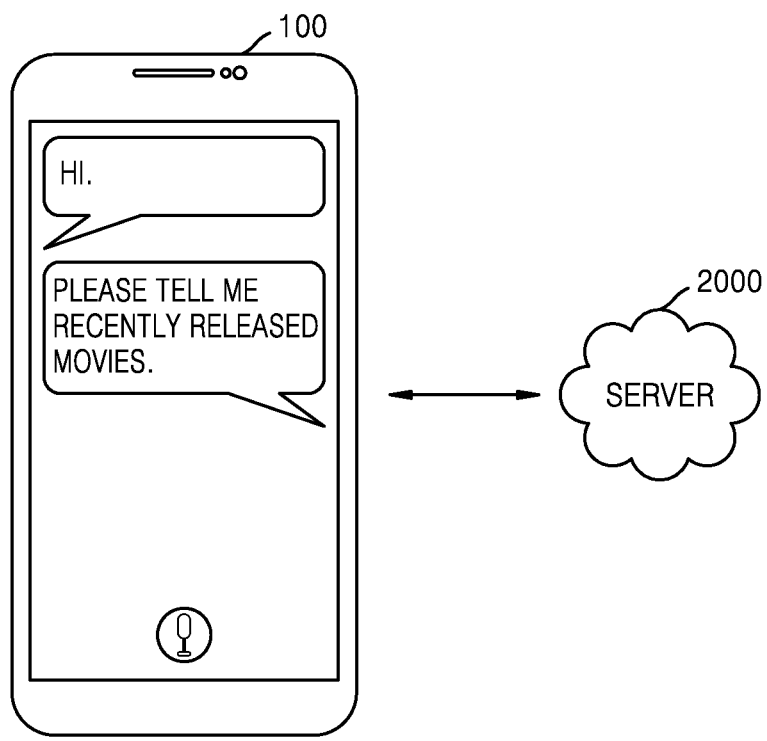
FIG. 18 illustrates an electronic device and a server learning and recognizing data by interworking with each other, according to an embodiment of the disclosure.

FIG. 18 illustrates an electronic device and a server learning and recognizing data by interworking with each other, according to an embodiment of the disclosure.

Referring to FIG. 18, the server 2000 may learn a criterion for determining a response corresponding to a user's speech or utterance according to an embodiment of the disclosure. For example, the server 2000 may learn a criterion for learning at least one of the ASR model, the NLU model, the DM model, the NLG model, or the TTS model. In this case, the server 2000 may perform functions of the data learner 1400 shown in FIG. 15.

The server 2000 may learn at least one of the ASR model, the NLU model, the DM model, the NLG model, or the TTS model by using learning data.

The electronic device 100 may transmit data (e.g., an audio signal corresponding to the user's speech or utterance) to the server 2000 and request the server 2000 to process the data by applying the data to data processing models (e.g., the ASR model, the NLU model, the DM model, the NLG model, and the TTS model). For example, the server 2000 may process the audio signal according to a preset purpose by using the data processing models (e.g., the ASR model, the NLU model, the DM model, the NLG model, and the TTS model). For example, the server 2000 may perform ASR, NLU, or DM with respect to the audio signal.

Alternatively, the electronic device 100 may receive the data processing models generated by the server 2000 and process the data by using the received data processing models. For example, the electronic device 100 may process data (e.g., the audio signal corresponding to the user's speech or utterance) according to a preset purpose by using the received data processing models (e.g., the ASR model, the NLU model, the DM model, the NLG model, and the TTS model). For example, the electronic device 100 may determine a response corresponding to the user's speech or utterance by performing ASR, NLU, DM, NLG, TTS, etc., with respect to the audio signal and provide the determined response to the user.

FIG. 19 is a flowchart of an operation method of an electronic device according to an embodiment of the disclosure.

Referring to FIG. 19, the electronic device 100 according to an embodiment of the disclosure may obtain ambient noise information of the electronic device 100 in operation S1910.

For example, the electronic device 100 may measure an ambient noise level by using a noise measurement sensor, etc., in which the noise level may be measured in dB. The noise level may be measured in dB(A), dB(B), dB(C), and dB(D) according to features. A feature A measured in dB(A) is similar to a sensational quality of human ears, and a noise level may be measured mainly using, but not limited to, the feature A.

The electronic device 100 may measure an SNR of the audio signal corresponding to the user's speech or utterance as noise information, in which the SNR may be measured in dB. As a magnitude of the SNR increases, a magnitude of noise may decrease.

The electronic device 100 may periodically obtain ambient noise information of the electronic device 100, or obtain the ambient noise information before receiving the user's speech or utterance. Alternatively, the electronic device 100 may obtain the ambient noise information while receiving the user's speech or utterance.

For example, the electronic device 100 may measure an ambient noise by using a microphone for receiving the user's speech or utterance and a separate microphone. Alternatively, the electronic device 100 may receive the user's speech or utterance using one microphone, and measure the ambient noise. In this case, the microphone may operate in a mode (first mode) for recognizing a user's speech or a mode (second mode) for measuring the noise.

The electronic device 100 may measure the ambient noise by periodically operating in the second mode. A period of noise measurement may be set by the user or may be determined based on remaining power of the electronic device 100.

Alternatively, the electronic device 100 may measure the ambient noise by operating in the second mode before operating in the first mode, and then operate in the first mode. The electronic device 100 may also measure the ambient noise while receiving the user's utterance, by using the first mode and the second mode, without being limited thereto.

The electronic device 100 according to an embodiment of the disclosure may receive the user's speech or utterance in operation S1920.

The electronic device 100 may convert the received user's speech or utterance into an audio signal.

In operation S1930, the electronic device 100 may determine a device to perform ASR with respect to the user's speech or utterance, based on the ambient noise information of the electronic device 100 obtained in operation S1910.

For example, the electronic device 100 may determine based on an ambient noise level whether the electronic device 100 or the server 2000 is to perform the ASR. The electronic device 100 may determine that the electronic device 100 is to perform the ASR when the ambient noise level is less than a preset value, and may determine that an external device (e.g., the server 2000) is to perform the ASR when the ambient noise level is greater than or equal to the preset value.

The electronic device 100 may also determine that the electronic device 100 is to perform the ASR when the SNR of the audio signal corresponding to the user's speech or utterance is greater than or equal to a preset value. On the other hand, when the SNR of the audio signal is less than the preset value, the electronic device 100 may determine that the server 2000 is to perform the ASR. However, the disclosure is not limited to this example.

The electronic device 100 may determine which device to perform ASR with respect to a user's speech or utterance, based on the ambient noise information and also network connection state information between the electronic device 100 and the server 2000, communication bandwidth information, user's location information, user's speech feature information, location and time information of the electronic device 100, etc.

While it is illustrated in FIG. 19 that the electronic device 100 determines a device to perform the ASR, after receiving the user's speech or utterance, the electronic device 100 may also determine a device to perform ASR based on the ambient noise information, before receiving the user's speech or utterance.

The electronic device 100 may transmit the audio signal corresponding to the user's speech or utterance to the external device in operation S1955, when the electronic device 100 determines that the external electronic device is to perform ASR in operation S1940-NO.

The server 2000 may perform ASR based on the received audio signal in operation S1960.

The electronic device 100 may receive a result of ASR from the external device in operation S1965.

On the other hand, the electronic device 100 may perform ASR with respect to the audio signal in operation S1950, when the electronic device 100 determines that the electronic device 100 is to perform ASR in operation S1940-YES.

For example, the electronic device 100 may obtain text data corresponding to the audio signal. The text data may include, but is not limited to, at least one string indicating a speech uttered by the user.

The electronic device 100 may provide a response to the user's speech or utterance based on a result of ASR performed on the electronic device 100 in S1950 or an ASR result received from an external device (e.g., the server 2000) having performed ASR in operation S1965, in operation S1970.

For example, the electronic device 100 may generate the response to the user's speech or utterance by performing NLU, DM, NLG, TTS, etc., with respect to a result of ASR, and display the generated response as a text or output the generated response as audio. The electronic device 100 may operate to perform a function corresponding to the response. However, the disclosure is not limited to this example.

The operation method of the electronic device according to an embodiment of the disclosure may be implemented in the form of program commands that may be executed through various computer components and recorded in a computer-readable recording medium. The computer-readable recording medium may include computer-readable instructions, a program command, a data file, a data structure and the like solely or in a combined manner. The programs in the computer-readable recording medium may be a program specially designed and configured for the present embodiments of the disclosure or a program command known to be used by those skilled in the art of the computer software field. Examples of the computer-readable recording medium may include magnetic media such as hard disk, floppy disk, and magnetic tape, optical media such as compact disk read only memory (CD-ROM) and digital versatile disk (DVD), magneto-optical media such as floptical disk, and a hardware device especially configured to store and execute a program command, such as read only memory (ROM), random access memory (RAM) and flash memory, etc. Further, examples of the program commands include a machine language code created by a complier and a high-level language code executable by a computer using an interpreter.

The electronic device or the operation method of the electronic device according to the embodiments of the disclosure may be included and provided in a computer program product. The computer program product may be traded as a product between a seller and a buyer.

The computer program product may include a software (S/W) program and a non-transitory computer-readable recording medium in which the S/W program is stored. For example, the computer program product may include a product (e.g., a downloadable application) in the form of a S/W program electronically distributed through a manufacturer or the electronic device or an electronic market (e.g., Google Play Store or App Store). For the electronic distribution, at least a portion of the S/W program may be stored in a storage medium or temporarily generated. In this case, the storage medium may be a storage medium of a server in the manufacturer or the electronic market or a relay server that temporarily stores the S/W program.

The computer program product may include a storage medium of a server or a storage medium of a client device, in a system including the server and the client device. Alternatively, when there is a third device (e.g., a smart phone) communicating with the server or the client device, the computer program product may include a storage medium of the third device. Alternatively, the computer program product may include a S/W program itself, which is transmitted from the server to the client device or the third device or transmitted from the third device to client device.

In this case, one of the server, the client device, and the third device may execute the computer program product to perform the method according to the embodiments of the disclosure. Alternatively, two or more of the server, the client device, and the third device may execute the computer program product to execute the method according to the embodiments of the disclosure in a distributed manner.

For example, a server (e.g., a cloud server or AI server, etc.) may execute a computer program product stored in the server to control the client device communicating with the server to perform the method according to the embodiments of the disclosure.

The electronic device according to an embodiment of the disclosure may determine which of the electronic device and the server is to perform the ASR, based on the ambient noise information, and process utterances processible on the electronic device, thereby preventing waste of resources and increase in delay time.

While the embodiments of the disclosure have been described in detail, the scope of the disclosure is not limited to the description and also includes various modifications and improvements made by those of ordinary skill in the art using the concept of the disclosure defined in the appended claims.

What is claimed is:

1. An electronic device comprising:
   a memory storing one or more instructions; and
   at least one processor configured to execute the one or more instructions stored in the memory, wherein when executing the one or more instructions the at least one processor is configured to:
   obtain an audio signal of a speech or an utterance of a user of the electronic device,
   obtain context information comprising location information of the electronic device and a physical distance between the user and the electronic device,
   transmit, to a server, the audio signal of the speech or the utterance of the user,
   perform an automated speech recognition (ASR) of the audio signal of the speech or the utterance of the user, resulting in a first ASR result, the first ASR result comprising a first ASR accuracy that varies based on a noise pattern of the audio signal,
   receive, from the server, a second ASR result of the audio signal of the speech or the utterance of the user, the second ASR result comprising a second ASR accuracy that varies based on the noise pattern of the audio signal,
   based on the first ASR accuracy being less than the second ASR accuracy, the location information matching a preset location, and the physical distance exceeding a preset distance, determine that the server is to perform natural language understanding (NLU) based on the second ASR result and transmit, to the server, a processing request to perform the NLU based on the second ASR result, and
   based on the first ASR accuracy being greater than the second ASR accuracy, perform the NLU based on the first ASR result.

2. The electronic device of claim 1, wherein the at least one processor is further configured to execute the one or more instructions to:
   obtain ambient noise information including an ambient noise level of the electronic device, and
   determine that the electronic device is to perform the ASR of the speech or the utterance of the user of the electronic device based on the ambient noise level of the electronic device being less than a second preset value.

3. The electronic device of claim 2, further comprising a communicator configured to transmit to and receive data from an external device,
   wherein the at least one processor is further configured to execute the one or more instructions to:
   based on the ambient noise level of the electronic device being greater than or equal to the second preset value, control the communicator to transmit the audio signal of the speech or the utterance of the user of the electronic device to the server, and receive, from the server, an ASR result of the speech or the utterance of the user of the electronic device.

4. The electronic device of claim 1, further comprising a communicator configured to transmit to and receive data from the server,
   wherein the at least one processor is further configured to execute the one or more instructions to:
   control the communicator to transmit the audio signal of the speech or the utterance of the user of the electronic device to the server,
   select an ASR result from among the first ASR result and the second ASR result, and
   output a response to the speech or the utterance of the user of the electronic device, based on the ASR result.

5. The electronic device of claim 4, wherein the at least one processor is further configured to execute the one or more instructions to select the ASR result from among the first ASR result and the second ASR result, based on ambient noise information of the electronic device.

6. The electronic device of claim 1, wherein the at least one processor is further configured to execute the one or more instructions to determine a response by performing the at least one of NLU or dialogue management (DM) based on a result of performing the ASR of the speech or the utterance of the user of the electronic device.

7. The electronic device of claim 1, wherein the ASR is processed using an artificial intelligence (AI) algorithm.

8. The electronic device of claim 2, wherein the at least one processor is further configured to execute the one or more instructions to:
   based on the ambient noise level of the electronic device having a value in a preset range, extract a keyword included in the speech or the utterance of the user of the electronic device and
   based on the keyword being a preset keyword, determine that the electronic device is to perform the ASR of the speech or the utterance of the user of the electronic device.

9. The electronic device of claim 1, wherein the at least one processor is further configured to execute the one or more instructions to determine whether the electronic device is to perform at least one of NLU or dialogue management (DM), based on at least one of ambient noise information or a result of performing the ASR of the speech or the utterance of the user of the electronic device.

10. An operation method of an electronic device, the operation method comprising:
    obtaining an audio signal of a speech or an utterance of a user of the electronic device;
    obtaining context information comprising location information of the electronic device and a physical distance between the user and the electronic device;
    transmitting, to a server, the audio signal of the speech or the utterance of the user;
    performing an automated speech recognition (ASR) of the audio signal of the speech or the utterance of the user, resulting in a first ASR result, the first ASR result comprising a first ASR accuracy that varies based on a noise pattern of the audio signal;
    receiving, from the server, a second ASR result of the audio signal of the speech or the utterance of the user, the second ASR result comprising a second ASR accuracy that varies based on the noise pattern of the audio signal;
    based on the first ASR accuracy being less than the second ASR accuracy, the location information matching a preset location, and the physical distance exceeding a preset distance, determining that the server is to perform natural language understanding (NLU) based on the second ASR result and transmitting, to the server, a processing request to perform the NLU based on the second ASR result, and based on the first ASR accuracy being greater than the second ASR accuracy, performing the NLU based on the first ASR result.

11. The operation method of claim 10, wherein the obtaining the audio signal comprises converting the speech or the utterance of the user of the electronic device into the audio signal of the speech or the utterance of the user of the electronic device.

12. The operation method of claim 10, further comprising:
obtaining ambient noise information including an ambient noise level of the electronic device; and
determining that the electronic device is to perform the ASR of the speech or the utterance of the user of the electronic device based on the ambient noise level of the electronic device being less than a second preset value.

13. The operation method of claim 12, further comprising:
based on the ambient noise level of the electronic device is greater than or equal to the second preset value, determining that the electronic device is not to perform the ASR of the speech or the utterance of the user of the electronic device;
transmitting the audio signal of the speech or the utterance of the user of the electronic device to the server; and
receiving, from the server, a result of the ASR of the speech or the utterance of the user of the electronic device.

14. The operation method of claim 10, wherein the operation method further comprises:
transmitting the audio signal of the speech or the utterance of the user of the electronic device to the server;
selecting an ASR result from among the first ASR result and the second ASR result, and
outputting a response to the speech or the utterance of the user of the electronic device based on the ASR result.

15. The operation method of claim 14, wherein the selecting comprises selecting the ASR result from among the first ASR result and the second ASR result, based on ambient noise information of the electronic device.

16. The operation method of claim 12, further comprising:
based on the ambient noise level of the electronic device having a value in a preset range, extracting a keyword included in the speech or the utterance of the user of the electronic device; and
based on the keyword being a preset keyword and based on the ambient noise information of the electronic device, determining that the electronic device is to perform the ASR of the speech or the utterance of the user of the electronic device.

17. The operation method of claim 10, further comprising determining whether the electronic device is to perform at least one of NLU or dialogue management (DM), based on at least one of ambient noise information or a result of performing the ASR of the speech or the utterance of the user of the electronic device.

18. An automated speech recognition (ASR) system comprising:
an electronic device configured to receive a speech or an utterance of a user of the electronic device; and
a server configured to perform ASR of the speech or the utterance of the user of the electronic device based on an audio signal of the speech or the utterance of the user of the electronic device received from the electronic device,
wherein the electronic device comprises at least one processor configured to:
obtain the audio signal of the speech or the utterance of the user of the electronic device,
obtain context information comprising location information of the electronic device and a physical distance between the user and the electronic device,
transmit, to the server, the audio signal of the speech or the utterance of the user,
perform an automated speech recognition (ASR) of the audio signal of the speech or the utterance of the user, resulting in a first ASR result, the first ASR result comprising a first ASR accuracy that varies based on a noise pattern of the audio signal,
receive, from the server, a second ASR result of the audio signal of the speech or the utterance of the user, the second ASR result comprising a second ASR accuracy that varies based on the noise pattern of the audio signal,
based on the first ASR accuracy being less than the second ASR accuracy, the location information matching a preset location, and the physical distance exceeding a preset distance, determine that the server is to perform natural language understanding (NLU) based on the second ASR result and transmit, to the server, a processing request to perform the NLU based on the second ASR result, and
based on the first ASR accuracy being greater than the second ASR accuracy, perform the NLU based on the first ASR result.

* * * * *